US011823587B2

United States Patent
Yen et al.

(10) Patent No.: US 11,823,587 B2
(45) Date of Patent: Nov. 21, 2023

(54) VIRTUAL REALITY SYSTEM WITH INSPECTING FUNCTION OF ASSEMBLING AND DISASSEMBLING AND INSPECTION METHOD THEREOF

(71) Applicant: DELTA ELECTRONICS, INC., Taoyuan (TW)

(72) Inventors: Yao-Han Yen, Taoyuan (TW); Wen-Hsin Lo, Taoyuan (TW); Yu-Ting Liu, Taoyuan (TW); Guan-Jhih Liou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/745,263

(22) Filed: May 16, 2022

(65) Prior Publication Data
US 2023/0230497 A1    Jul. 20, 2023

(30) Foreign Application Priority Data

Jan. 14, 2022   (CN) .......................... 202210041438.9

(51) Int. Cl.
*G09B 19/00* (2006.01)
*G06V 20/20* (2022.01)
(Continued)

(52) U.S. Cl.
CPC ............ *G09B 19/003* (2013.01); *G06F 3/011* (2013.01); *G06T 17/20* (2013.01); *G06T 19/20* (2013.01);
(Continued)

(58) Field of Classification Search
CPC ........ G09B 19/003; G09B 5/02; G06V 20/20; G06F 3/011; G06T 177/20; G06T 19/20;
(Continued)

(56) References Cited

U.S. PATENT DOCUMENTS 9,384,675 B2 *   7/2016  Zboray ................. G09B 19/00
9,569,889 B2 *   2/2017  Chen .................... G06F 3/04847
(Continued)

FOREIGN PATENT DOCUMENTS

CN         110491233 A      11/2019
WO     WO-2011097035 A2 *   8/2011 ............. G09B 19/00
(Continued)

OTHER PUBLICATIONS

Office Action dated Sep. 29, 2022 of the corresponding Taiwan patent application No. 111101604.

*Primary Examiner* — Xuan M Thai
*Assistant Examiner* — Sadaruz Zaman
(74) *Attorney, Agent, or Firm* — Chun-Ming Shih; HDLS IPR SERVICES

(57) ABSTRACT

A virtual reality system with an inspecting function of assembling and disassembling and an inspection method of assembling and disassembling based on virtual reality are presented. A learning-end acquires an inspection data and a teaching assembling-disassembling record being set with a plurality of checkpoints, plays the teaching assembling-disassembling record, modifies a learning assembling-disassembling status of a plurality of virtual objects based on user's operations for assembling or disassembling. The learning-end issues an assembling-disassembling error reminder when the learning assembling-disassembling status is inconsistent with a teaching assembling-disassembling status at any of the checkpoints.

18 Claims, 30 Drawing Sheets

(51) Int. Cl.
*G06T 17/20* (2006.01)
*G06T 19/20* (2011.01)
*G09B 5/02* (2006.01)
*G06F 3/01* (2006.01)

(52) U.S. Cl.
CPC .............. *G06V 20/20* (2022.01); *G09B 5/02* (2013.01); *G06T 2200/24* (2013.01); *G06T 2210/12* (2013.01); *G06T 2210/21* (2013.01); *G06T 2219/2008* (2013.01)

(58) Field of Classification Search
CPC ............. G06T 2200/24; G06T 2210/12; G06T 2210/21; G06T 2219/2008
See application file for complete search history.

(56) References Cited

U.S. PATENT DOCUMENTS

| | | | |
|---|---|---|---|
| 9,747,722 B2 * | 8/2017 | Adler | A63F 13/655 |
| 10,388,176 B2 * | 8/2019 | Wallace | G09B 5/06 |
| 10,607,084 B1 * | 3/2020 | Tang | G06F 16/7837 |
| 11,087,525 B2 * | 8/2021 | Hoang | G06T 15/08 |
| 11,348,250 B2 * | 5/2022 | Koster | G06T 7/62 |
| 11,348,475 B2 * | 5/2022 | Wood | G09B 19/24 |
| 11,355,025 B2 * | 6/2022 | Wallace | G09B 19/24 |
| 11,514,658 B2 * | 11/2022 | Ali | G06T 15/205 |
| 11,544,907 B2 * | 1/2023 | Fred | A63F 13/65 |
| 11,567,572 B1 * | 1/2023 | Pratt | G06F 3/016 |
| 2013/0323695 A1 * | 12/2013 | Zboray | G09B 19/00 434/219 |
| 2019/0108578 A1 * | 4/2019 | Spivack | G09B 5/065 |
| 2019/0139430 A1 * | 5/2019 | Ghatage | G06F 40/58 |
| 2019/0164444 A1 * | 5/2019 | Bramlet | G09B 7/02 |
| 2019/0392728 A1 * | 12/2019 | Pike | G06T 19/003 |
| 2022/0246058 A1 * | 8/2022 | Merjanian | G06T 19/006 |
| 2022/0292999 A1 * | 9/2022 | Kratzer | G06N 20/00 |

FOREIGN PATENT DOCUMENTS

| | | | | |
|---|---|---|---|---|
| WO | WO-2011126571 A1 * | 10/2011 | | G06F 3/011 |
| WO | WO-2014085771 A1 * | 6/2014 | | G09B 5/06 |
| WO | WO-2019055821 A1 * | 3/2019 | | B05C 11/00 |

* cited by examiner

VIRTUAL REALITY SYSTEM WITH INSPECTING FUNCTION OF ASSEMBLING AND DISASSEMBLING AND INSPECTION METHOD THEREOF

BACKGROUND OF THE DISCLOSURE

Technical Field

The technical field relates to a virtual reality system, and more particularly related to a virtual reality system with an inspecting function of assembling and disassembling and an inspecting method of assembling and disassembling based on virtual reality.

Description of Related Art

In the application of a virtual reality teaching system of the related art, a teacher may give a teaching demonstration in virtual reality through operating a virtual reality device, such as assembling and/or disassembling a mechanical apparatus, assembling a model, assembling furniture, and so on.

Then, the virtual reality teaching system may record the teaching demonstration, obtain a VR video of the teaching demonstration, and store the VR video. Then, a student may play the VR video to reproduce the teaching demonstration in virtual reality through a virtual reality device at any time for learning.

However, when the student practices (such as assembling and/or disassembling a mechanical apparatus, assembling a model, assembling furniture, and so on) with the live VR video, the student is unable to check whether the practiced result is correct or incorrect instantly in an absence of immediate supervision from the teacher. As a result, the student may get a significantly low learning efficiency. Thus, the virtual reality teaching system of the related art can only achieve one-way learning and fail to check the instant learning status of the students.

The existing virtual reality teaching system has the above-mentioned problems and needs a more effective solution.

SUMMARY OF THE DISCLOSURE

The technical field relates to a virtual reality system with an inspecting function of assembling and disassembling and an inspecting method of assembling and disassembling based on virtual reality, which have an ability to inspect an assembling-disassembling status of a learning-end.

In one of the embodiments, a virtual reality system with an inspecting function of assembling and disassembling includes a server-end and a learning-end. The server-end is used to provide a teaching assembling-disassembling record and an inspection data, wherein the inspection data includes teaching assembling-disassembling statuses of virtual objects at each checkpoint. The learning-end includes a learning module and a learning virtual reality device, the learning virtual reality device is used to play the teaching assembling-disassembling record and receive user's operations, the learning virtual reality device is used to assemble and disassemble the virtual objects based on the user's operations to modify a learning assembling-disassembling status of the virtual objects and issue an assembling-disassembling error reminder when the learning assembling-disassembling status is inconsistent with the teaching assembling-disassembling status at any checkpoint.

In one of the embodiments, an inspecting method of assembling and disassembling based on virtual reality includes: a) at a learning-end, acquiring an inspection data and a teaching assembling-disassembling status configured with multiple checkpoints, wherein the inspection data comprises teaching assembling-disassembling statuses of virtual objects at each checkpoint; b) at the learning-end, playing the teaching assembling-disassembling record; c) at the learning-end, receiving user's operations to assemble and disassemble the virtual objects to modify a learning assembling-disassembling status of the virtual objects; and d) issuing an assembling-disassembling error reminder when the learning assembling-disassembling status is inconsistent with the teaching assembling-disassembling status at any checkpoint.

The present disclosure may instantly check whether the assembling-disassembling status of the learning-end is correct or incorrect and improve the learning efficiency and correctness of the student.

BRIEF DESCRIPTION OF THE DRAWINGS

The features of the present disclosure are believed to be novel are set forth with particularity in the appended claims. The present disclosure itself, however, may be best understood by reference to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

To solve a problem of the virtual reality teaching system of the related art being unable to check an instant assembling-disassembling status done by the student is correct or incorrect, the present disclosure provides a virtual reality system with an inspecting function of assembling and disassembling and an inspecting method of assembling and disassembling based on virtual reality, enabling to set checkpoints in a teaching assembling-disassembling record recorded by a teacher and to instantly check a learning assembling-disassembling status of the student when the teaching assembling-disassembling record is played back.

Figure 1A:
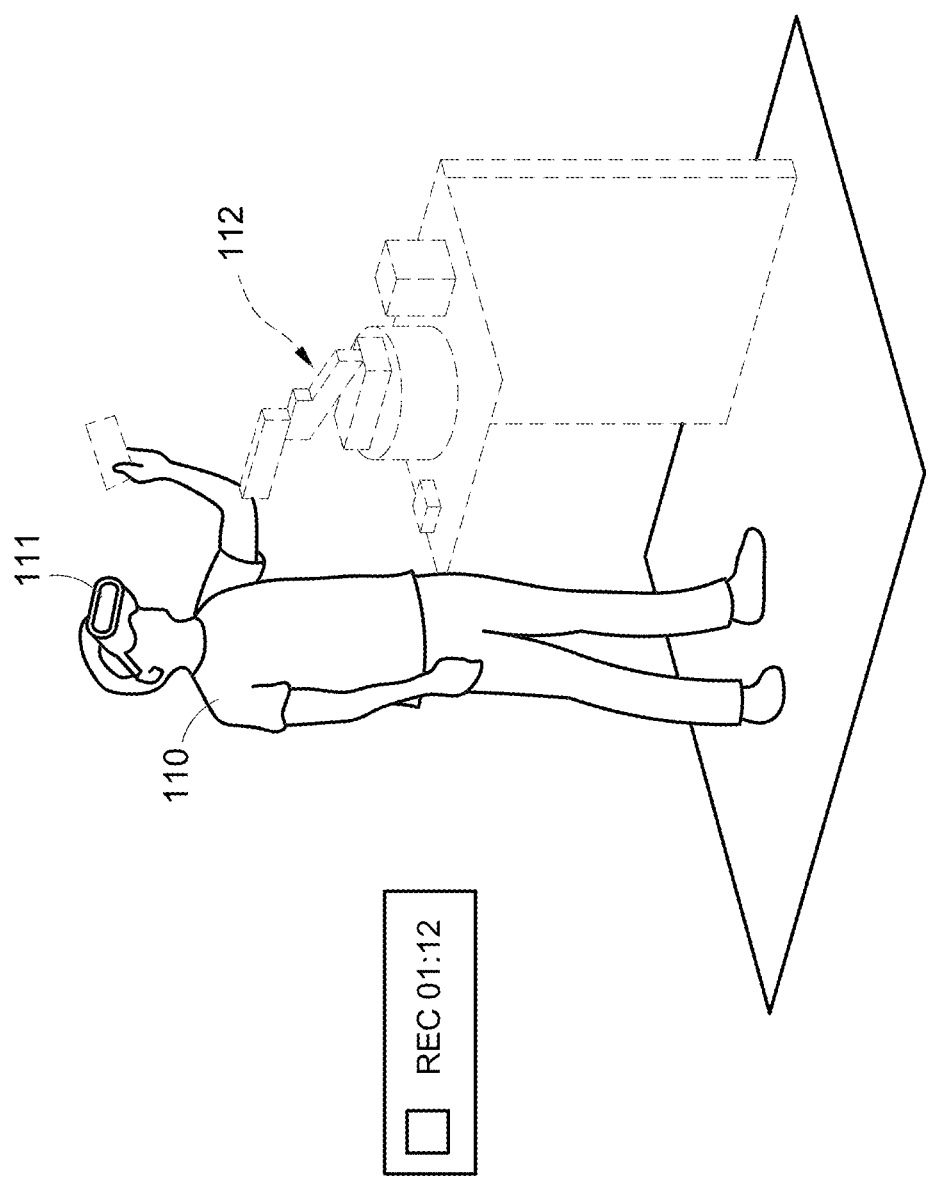
FIG. 1A illustrates an operation schematic view of a teaching-end of one embodiment of the present disclosure.
Figure 1B:
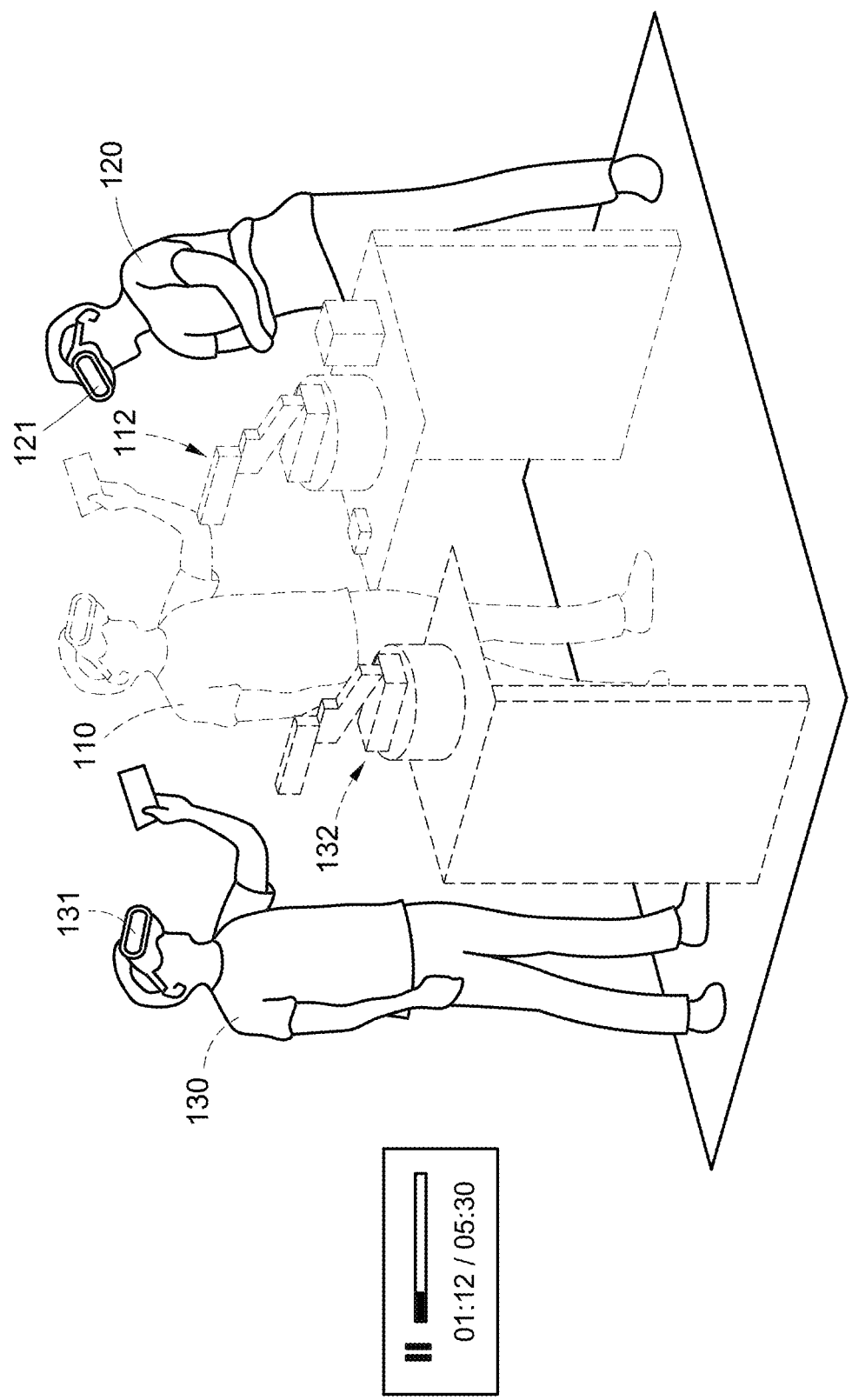
FIG. 1B illustrates an operation schematic view of a learning-end of one embodiment of the present disclosure.

Please refer to FIG. 1A and FIG. 1B. FIG. 1A illustrates an operation schematic view of a teaching-end of one embodiment of the present disclosure. FIG. 1B illustrates an operation schematic view of a learning-end of one embodiment of the present disclosure.

Before starting to record, a teacher 110 may create an assembling-disassembling lesson (such as a teaching demonstration of assembling and/or disassembling a robotic arm), set a basic data of the assembling-disassembling lesson (such as a lesson topic, a description, and browsing permissions, etc.), and create virtual objects 112 needed by this lesson (such as a virtual end effector, virtual arms, a virtual base, or a virtual fixture, etc.).

Then, as shown in FIG. 1A, the teacher 110 may wear a teaching virtual reality device 111 including a VR display and a VR console to start recording the assembling-disassembling lesson.

More specifically, the teacher may wear the teaching virtual reality device 111 to assemble and/or disassemble the virtual objects in virtual reality.

Moreover, the virtual reality system may record an assembling-disassembling procedure performed by the teacher 110 to generate a teaching assembling-disassembling record that is reproducible in virtual reality. The above-mentioned teaching assembling-disassembling record may be a VR video.

Furthermore, when recording or finished recording, the teacher 110 may set one or more checkpoint(s) of the teaching assembling-disassembling record at one or more timepoint(s) in the teaching assembling-disassembling record or at one or more assembling/disassembling steps in the teaching assembling-disassembling record. Then, the virtual reality system may acquire each teaching assembling-disassembling status of the virtual objects at each checkpoint and set them as an inspection data. The teaching assembling-disassembling status may include a linking relationship, positions, rotations, and orientations, etc. of the virtual objects 112.

Finally, the virtual reality system may store the teaching assembling-disassembling record being set with the checkpoints and the inspection data thereof in a course storage space (such as a storage server, a network database, or a cloud drive, etc.) to provide the teaching assembling-disassembling record for the students to download.

Then, as shown in FIG. 1B, in an example of learning through watching only, a student 120 may operate a learning virtual reality device 121 to download the above-mentioned teaching assembling-disassembling record and the inspection data, and the student 120 may reproduce the assembling-disassembling procedure performed by the teacher 110 in virtual reality.

Moreover, in an example of learning through asynchronous operations, student 130 may operate a learning virtual reality device 131 to reproduce the virtual objects 132 used in the teaching assembling-disassembling record in virtual reality.

Then, the student 130 may watch the reproduced assembling-disassembling procedure performed by the teacher 110, and assemble/disassemble the virtual objects 132 at the same time.

Moreover, when the teaching assembling-disassembling record is played to any checkpoint, the virtual reality system of the present disclosure may automatically compare the learning assembling-disassembling status of the student 130 with the teaching assembling-disassembling status of the current checkpoint to determine whether the learning assembling-disassembling status is consistent with the teaching assembling-disassembling status of the current checkpoint, so as to instantly verify whether the student 130 learns the assembling-disassembling procedure correctly.

Figure 2:
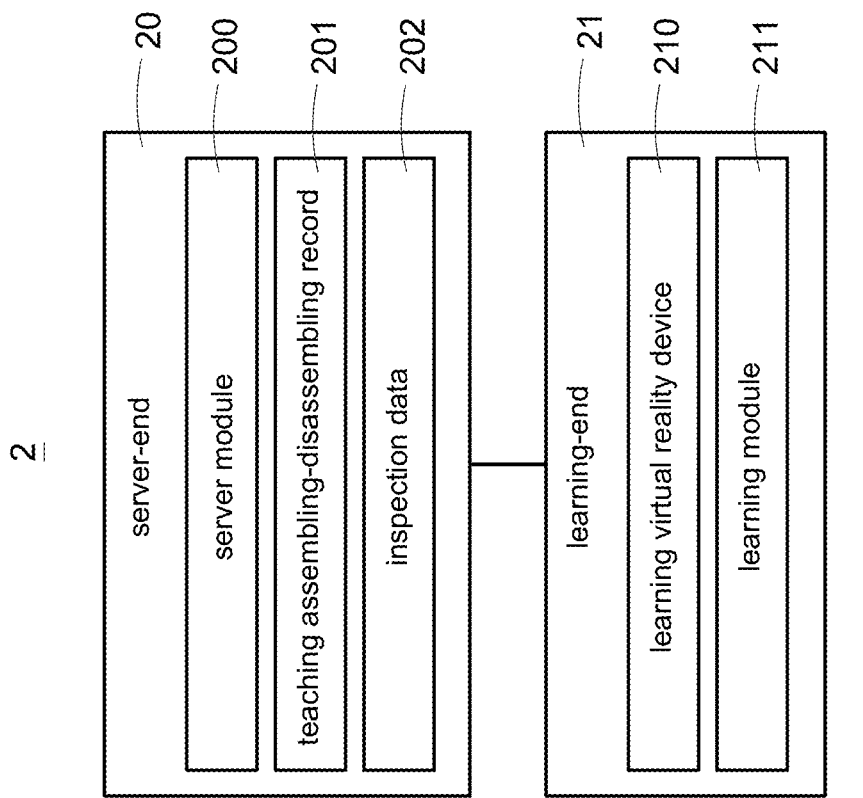
FIG. 2 illustrates an architecture diagram of a virtual reality system of one embodiment of the present disclosure.

Please refer to FIG. 2. FIG. 2 illustrates an architecture diagram of a virtual reality system of one embodiment of the present disclosure.

The virtual reality system 2 of this embodiment may include a server-end 20 and a learning-end 21 connected to each other through network.

The server-end 20 is operated by a course manager, and may be a server or a cloud computing platform, etc., but this specific example is not intended to limit the scope of the present disclosure.

The learning-end 21 is operated by the student, and may be a PC, a laptop, a tablet, a game console, or a mobile device, etc., but this specific example is not intended to limit the scope of the present disclosure.

The server-end 20 is used to provide a teaching assembling-disassembling record 201 and an inspection data 202. The above-mentioned teaching assembling-disassembling record 201 may be set with one or more checkpoint(s). The inspection data 200 may include each teaching assembling-disassembling status of the virtual objects used by the teaching assembling-disassembling record 201 at each checkpoint.

The server-end 20 may include a server module 200. The server module 200 is used to control the server-end 20 to execute the following data transmission, control, and process. The learning-end 21 may include a learning virtual reality device 210 and a learning module 211.

The learning virtual reality device 210 is used to play the teaching assembling-disassembling record 201 for reproducing the assembling-disassembling procedure of the teacher, and the learning virtual reality device 210 is used to receive operations from the student to assemble and disassemble the displayed virtual objects.

The learning module 211 is used to control the learning-end 21 to execute the following data transmission, control, and process.

In one of the embodiments, during playing the teaching assembling-disassembling record, the learning module 211 may assemble and/or disassemble the virtual objects based on the student's operations to modify the learning assembling-disassembling status of the virtual objects such as the relative positions and the relative connection relationships, etc. of the virtual objects, and the learning module 211 may issue an assembling-disassembling error reminder to remind the student that the current operation is incorrect when the learning assembling-disassembling status is inconsistent with the teaching assembling-disassembling status at any checkpoint of the played teaching assembling-disassembling record.

Figure 3:
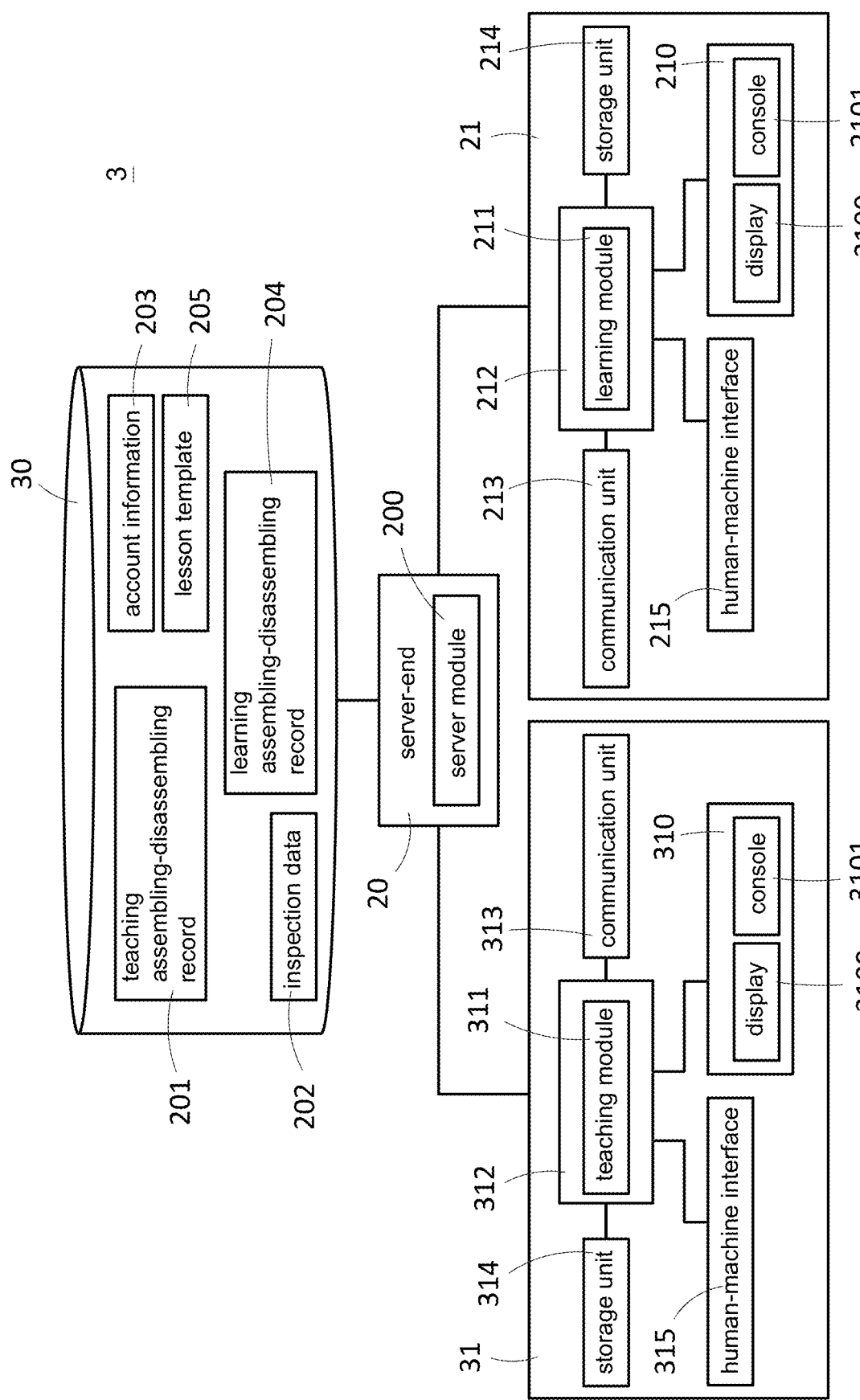
FIG. 3 illustrates an architecture diagram of a virtual reality system of one embodiment of the present disclosure.

Please refer to FIG. 3. FIG. 3 illustrates an architecture diagram of a virtual reality system of one embodiment of the present disclosure.

In this embodiment, the virtual reality system 3 may include a server-end 20, a learning-end 21, a network database 30, and a teaching-end 31.

The server-end 20 may connect to the network database 30, the learning-end 21, and the teaching-end 31 through a network (such as the Intranet or the Internet).

The network database 30 may store at least one teaching assembling-disassembling record 201, at least one inspection data 202, at least one account information 203, at least one learning assembling-disassembling record 204, and at least one lesson template 205.

In one of the embodiments, the account information 203 may include a teacher account information used by the teaching-end 31 and a student account information used by the learning-end 21. The teacher account information and the student account information may include a basic information, an account password, an authority, and a course record (such as uploaded lessons or watched lessons), etc. of the teacher and/or the student.

In one of the embodiments, the learning assembling-disassembling record 204 is uploaded from the learning-end 21. A content of the learning assembling-disassembling record is related to an assembling-disassembling procedure done by the student after watching the teaching assembling-disassembling record 201.

In one of the embodiments, the lesson templates 205 are provided for the teaching-end 31 to download. Multiple lesson templates 205 respectively correspond to different types of lessons. Moreover, the lesson templates 205 may include virtual objects built-in in advance, so that the teacher may quickly create a lesson through using the lesson templates 205.

In one of the embodiments, the learning-end 21 may include a learning virtual reality device 210, a learning module 211, a processing unit 212, a communication unit 212, a storage unit 214, and a human-machine interface 215.

In one of the embodiments, the learning virtual reality device 210 may include a display 2100 and a console 2101 for virtual reality.

The teaching-end 31 may be a computer similar to the learning-end 21. The difference between the teaching-end 31 and the learning-end 21 is that the teaching-end 31 and the learning-end 21 are operated by different users.

In one of the embodiments, the teaching-end 31 may include a teaching virtual reality device 310, a teaching module 311, a processing unit 312, a communication unit 313, a storage unit 314, and a human-machine interface 315.

In one of the embodiments, the teaching virtual reality device 310 may include a display 3100 and a console 3101 for virtual reality.

In one of the embodiments, the learning virtual reality device 210 and the teaching virtual reality device 310 may be any of the existing virtual reality devices in the markets. The displays 2100 and 3100 are used to show the virtual reality screen. The consoles 2101 and 3101 (such as a control gamepad or a joystick) are used to receive user's operations to operate in virtual reality.

In one of the embodiments, the processing units 212 and 312 may be a circuit with a processing capability, such as a processor or a microcontroller, etc. The communication units 213 and 313 may be a network interface card, and the communication units 213 and 313 are used to connect to the network and execute data transmission through the network. The storage units 214 and 314 may include a volatile memory (such as RAM) and/or a non-volatile memory (such as ROM, EEPROM, solid state drives, hard disk drives, or flash memory, etc.) and are used to store data. The human-machine interfaces 215 and 315 may include an input interface (such as a keyboard, a mouse, or a trackpad, etc.) and an output interface (such as a display or a speaker, etc.), and the human-machine interfaces 215 and 315 are used to receive the user's operation and to provide information.

In one of the embodiments, the virtual reality system 3 of this embodiment may provide a teaching material creating function and an interactive learning function. The teaching material crating function is implemented through the teaching-end 31 and the server-end 20. The interactive learning function is implemented through the server-end 20 and the learning-end 21.

The data, such as the teaching assembling-disassembling record and the inspection data, generated by the teaching material creating function may be used in the interactive learning function. Moreover, the data (such as the learning assembling-disassembling record) generated by the interactive learning function may be imported into the teaching material creating function after analyzing and processing. Thus, the present disclosure may form an organic dynamic circulation system of teaching materials.

In the above-mentioned teaching material creating function, the teacher may operate the teaching-end 31 to edit lesson information, upload the teaching materials (such as the teaching assembling-disassembling record 201 and the inspection data 202, and the teaching materials may include text data, numerical data, image data, and 3D models, etc.), and set a course collaboration mode (including production methods such as single-person collaboration, multi-person collaboration, single-person autonomy, and multi-person synchronization, etc.).

Moreover, the teacher may operate the teaching-end 31 to set a course execution mode, select a lesson template 205, record the teaching assembling-disassembling record 201, and set the checkpoints and the inspection data 202.

About the course execution mode, the teacher may set a teaching mode, a guidance mode, and an exploration mode according to the dimension from strong scaffolding to weak scaffolding, and may set up tests and evaluations according to the purpose of learning.

About selecting the lesson template 205, the teacher may plan the teaching content according to the structural paragraphs recommended by the system to produce courses with high teaching effects.

About recording the teaching assembling-disassembling record 201, the system may record the teacher's voice, all behaviors, and actions in the virtual environment, and all mark symbols, paint brushes, and key reminders in 3D space generated through using system tools. The teacher may combine the records with course materials for teaching at the same time.

About setting the checkpoints and the inspection data 202, the system may automatically generate the checkpoints when it detects changes in the relationships between virtual objects, otherwise the teacher may manually set the checkpoints.

After the teaching assembling-disassembling record 201 and the inspection data 202 are generated, the teaching-end 31 may upload the teaching assembling-disassembling record 201 and the inspection data 202 to the network database 30 to complete the publication of the lesson.

In the above-mentioned interactive learning function, the student may operate the learning-end 21 to download the lesson (i.e., the teaching assembling-disassembling record 201 and the inspection data 202), play the teaching assembling-disassembling record 201 to observe the teacher's assembling-disassembling procedure through the learning virtual reality device 210, and operate the learning virtual reality device 210 to imitate the teacher's assembling-disassembling procedure synchronously or after watching.

During imitating the teacher's assembling-disassembling procedure, the learning module 211 may automatically inspect the learning assembling-disassembling status of the student at each checkpoint and give feedback instantly, so that the student may be notified whether the action of the imitation is correct or incorrect.

Moreover, the whole imitation of the assembling-disassembling procedure may be recorded as a learning assembling-disassembling record 204 and uploaded to the network database 30 through the server-end 20 for subsequent analysis.

Figure 4:
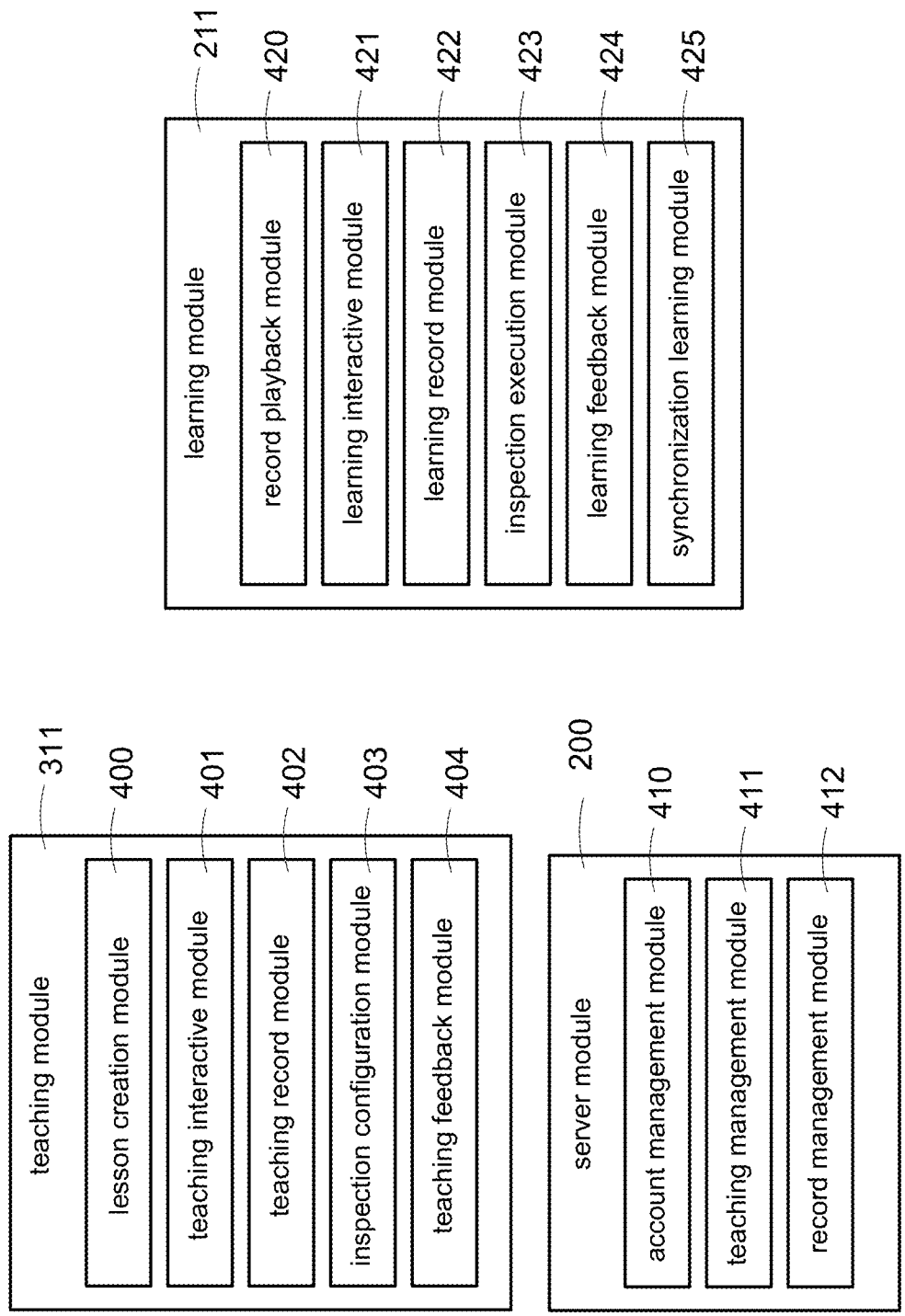
FIG. 4 illustrates architecture diagrams of a teaching module, a server module, and a learning module of one embodiment of the present disclosure.

Please refer to FIG. 4. FIG. 4 illustrates architecture diagrams of a teaching module, a server module, and a learning module of one embodiment of the present disclosure.

In one of the embodiments, the teaching module 211 may include different modules for implementing different functions, such as a lesson creation module 400, a teaching interactive module 401, a teaching record module 402, an inspection configuration module 403, and a teaching feedback module 404.

The lesson creation module 400 is configured to create the lesson and set the lesson information.

The teaching interactive module 401 is configured to enable the teacher to interact with the virtual objects through the teaching virtual reality device 310.

The teaching record module 402 is configured to record the teacher's assembling-disassembling procedure for generating the teaching assembling-disassembling record 201.

The inspection configuration module 403 is configured to set the checkpoints in the teaching assembling-disassembling record 201 and generate the inspection data 202 of each checkpoint.

The teaching feedback module 404 is configured to enable the teacher to provide feedback information to the server-end 20. The feedback information may be, for example but not limited to, the created virtual object, the lesson configuration, and the operational comments, etc.

In one of the embodiments, the server module 200 may include different modules for implementing different functions, such as an account management module 410, a teaching management module 411, and a record management module 412.

The account management module 410 is configured to manage the account information 203 and verify the login behaviors of the learning-end 21 and the teaching-end 31.

The teaching management module 411 is configured to manage the teacher's course-related configurations and the student's learning progress, etc.

The record management module 412 is configured to manage the teaching assembling-disassembling record 201, the inspection data 202 and the learning assembling-disassembling record 204.

In one of the embodiments, the learning module 211 may include different modules for implementing different functions, such as a record playback module 420, a learning interactive module 421, a learning record module 422, an inspection execution module 423, a learning feedback module 424, and a synchronization learning module 425.

The record playback module 420 is configured to play the downloaded teaching assembling-disassembling record 201 and/or the recorded learning assembling-disassembling record 204.

The learning interactive module 421 is configured to enable the student to interact with the virtual objects through the learning virtual reality device 210. The interaction made by the student with the virtual objects may include making a 3D annotation, taking notes, content-exporting, recording learning content, whiteboard-sharing, and data-sharing, etc.

The learning record module 422 is configured to record the student's assembling-disassembling procedure for generating the learning assembling-disassembling record 204.

The inspection execution module 423 is configured to compare the students' actions, results, and virtual values in virtual reality with the inspection data 202 at each checkpoint, and is configured to provide operational feedback and suggestions.

The learning feedback module 424 is configured to enable the student to provide feedback information to the server-end 20. The feedback information may be, for example but not limited to, lesson comments or operational comments, etc.

The synchronization learning module 425 is configured to implement collaborative operations among multiple learning-ends 21 or between the teaching-end 31 and the learning-end 21, so as to implement online multiplayer interactions in a virtual environment.

Please be noted that, the above-mentioned modules (such as the modules 311, 200, and 211, the modules 400 to 404, the modules 410 to 412, and the modules 420 to 425) are connected to each other (such as by electrical connection or information link), and each module may be a hardware module (such as an electronic circuit module, an integrated circuit module, or an SoC, etc.), a software module, or a combination of hardware module and software module. However, this specific example is not intended to limit the scope of the present disclosure.

If one of the above-mentioned modules is a software module such as firmware, an application program, or an operating system, a corresponding storage unit (such as a storage of the server-end 20, the storage unit 214 of the learning-end 21, and the storage unit 314 of the teaching-end 31) may include a non-transitory computer-readable media. The non-transitory computer-readable media stores a computer program. The computer program records computer-readable codes. When the processor (such as a processor of the server-end 20, the processing unit 212 of the learning-end 21 and the processing unit 312 of the teaching-end 31) executes the above computer-readable codes, the control functions of the software module may be achieved correspondingly.

Figure 5:
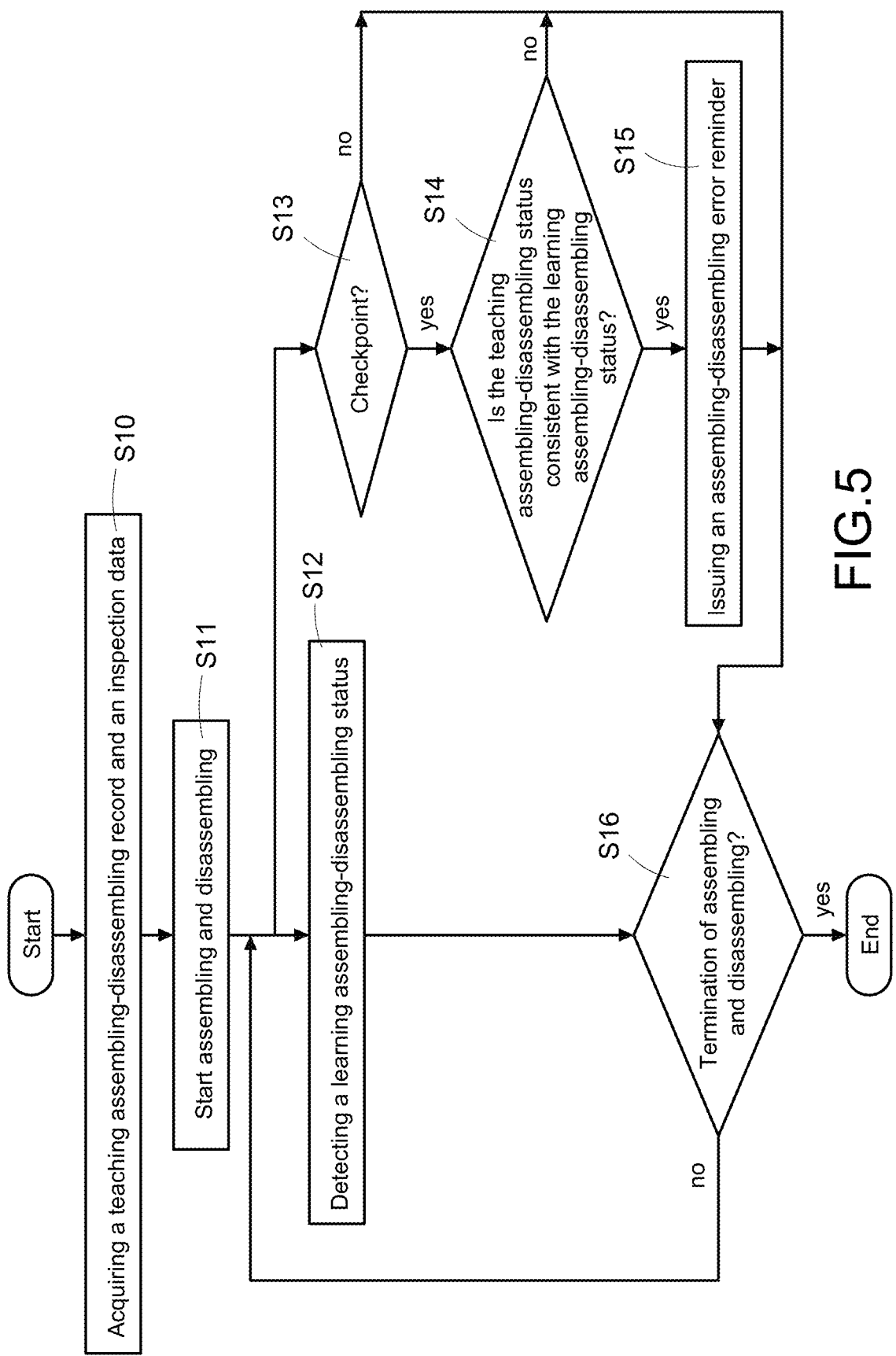
FIG. 5 illustrates a flowchart of an inspecting method of assembling and disassembling of one embodiment of the present disclosure.

Please refer to FIG. 5. FIG. 5 illustrates a flowchart of an inspecting method of assembling and disassembling of one embodiment of the present disclosure. The inspection method of assembling and disassembling of each embodiment of the present disclosure may be implemented by the virtual reality system of any embodiment.

The inspection method of assembling and disassembling may include steps S10 to S16.

In step S10, the learning-end 21 acquires the teaching assembling-disassembling record 201 and the corresponding inspection data 202 through the server-end 20. One or more checkpoint(s) are set in the teaching assembling-disassembling record 201. The inspection data 202 includes each teaching assembling-disassembling status of the virtual objects of the teaching assembling-disassembling record 201 at each checkpoint.

In step S11, the student starts to assemble and/or disassemble the virtual objects through the learning virtual reality device 210.

In one of the embodiments, the learning virtual reality device 210 may play the teaching assembling-disassembling record 201, so that the student may perform the assembling-disassembling procedure according to the screen displayed by the learning virtual reality device 210.

In step S12, the learning-end 21 detects an instant learning assembling-disassembling status through the inspection execution module 423.

More specifically, when the student operates the learning virtual reality device 210 to assemble and disassemble the virtual objects to modify the learning assembling-disassembling status of the virtual objects, the learning module 211 may instantly detect the above modification to acquire the newest learning assembling-disassembling status of the virtual objects.

At the same time of performing the step S12, in step S13, the learning-end 21 determines whether a current playback progress achieves any checkpoint of the teaching assembling-disassembling record 201 through the inspection execution module 423.

If no checkpoint is detected, the learning-end 21 performs step S16.

When any checkpoint is detected, the learning-end 21 performs step S14. In step S14, the learning-end 21 acquires, through the inspection execution module 423, the teaching assembling-disassembling status at the current checkpoint form the inspection data 202 and compares the current learning assembling-disassembling status with the acquired teaching assembling-disassembling status.

When the current learning assembling-disassembling status is consistent with the teaching assembling-disassembling status, the learning-end 21 performs step S16.

When the current learning assembling-disassembling status is inconsistent with the teaching assembling-disassembling status, the learning-end 21 performs step S15. In step S15, the learning-end 21 issues an assembling-disassembling error reminder through the inspection execution module 423 for instantly notifying the student that there is an error in the current assembling-disassembling procedure. In one embodiment, the assembling-disassembling error reminder may be a reminder of sounds, texts, or images, etc., but not limited thereto.

Next, step S16 is performed. In step S16, the learning-end 21 determines whether the assembling-disassembling procedure is terminated. For example, the learning-end 21 determines whether the playback of the teaching assembling-disassembling record 201 is finished or exited, or whether the student turns off the learning virtual reality device 210.

When determining that the assembling-disassembling procedure is terminated, the learning-end 21 finishes the inspection method of assembling and disassembling. Otherwise, the learning-end 21 performs the steps S12 and S13 again.

The present disclosure may instantly check whether the assembling-disassembling status of the learning-end 21 is correct or incorrect, so as to improve the learning efficiency and correctness of the student.

Figure 6:
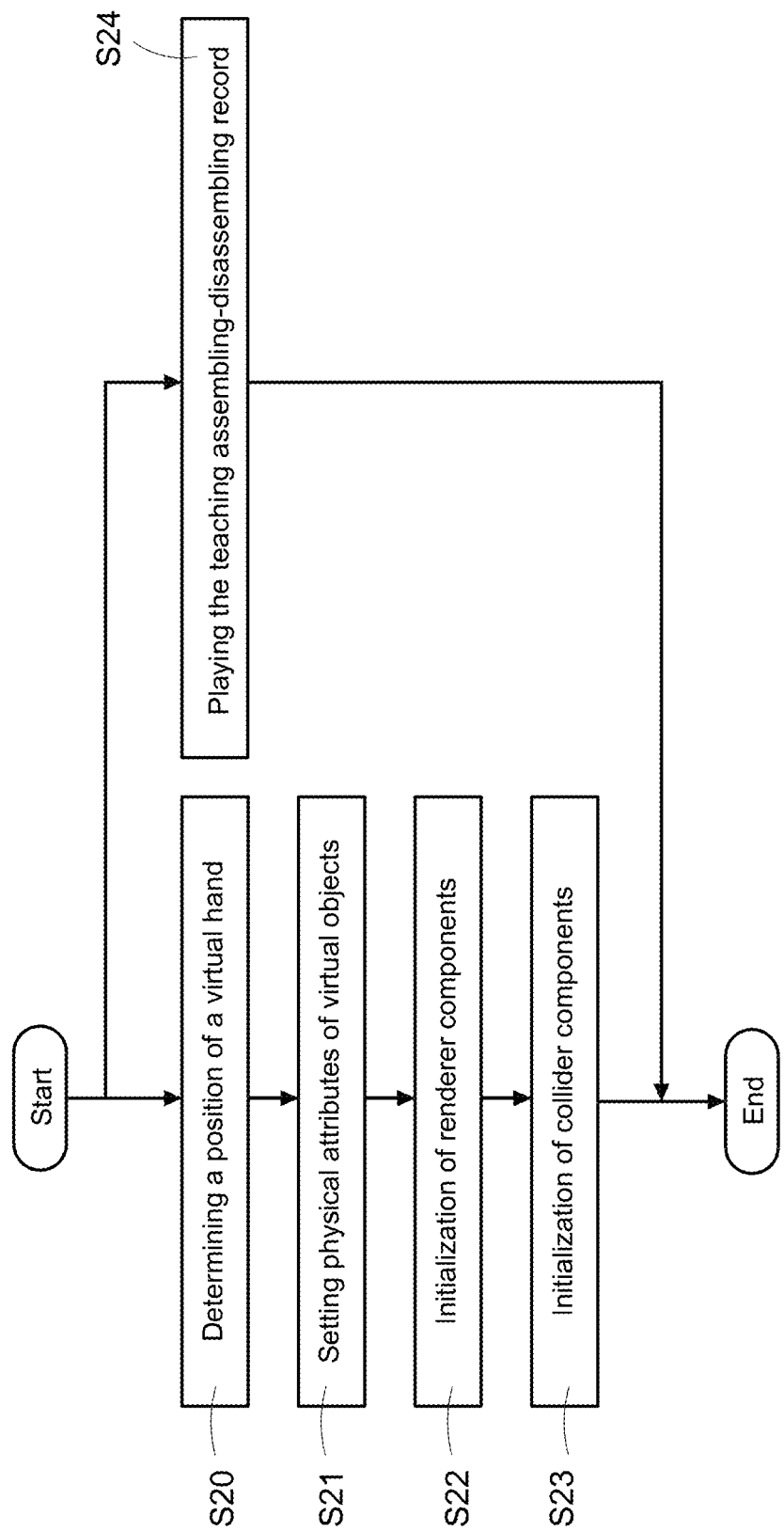
FIG. 6 illustrates a partial flowchart of an inspecting method of assembling and disassembling of one embodiment of the present disclosure.

Please refer to FIGS. 5 and 6. FIG. 6 illustrates a partial flowchart of an inspecting method of assembling and disassembling of one embodiment of the present disclosure.

In comparison with the inspection method of assembling and disassembling shown in FIG. 5, the inspection method of assembling and disassembling of this embodiment includes steps S20 to S24 before starting assembling and disassembling (i.e., before step S12 as shown in FIG. 5).

In step S20, the learning-end 21 positions a virtual hand through the learning interactive module 421 to determine a position of the virtual hand in the virtual reality space.

In one of the embodiments, the student may operate the console 2101 of the learning virtual reality device 210 to correspondingly move the virtual hand in the virtual reality space based on the student's operation (user's operation) through the learning-end 21. The user's operation may include, for example but not limited to, moving the console 2101 in the real space or operating input interfaces like buttons or knobs, etc. on the console 2101.

In step S21, the learning-end 21 sets physical attributes of the virtual objects through the record playback module 420 based on the teaching assembling-disassembling record 201.

In step S22, the learning-end 21 initializes renderer components through the record playback module 420 based on the teaching assembling-disassembling record 201 for preparing to render the virtual objects in virtual reality.

In step S23, the learning-end 21 initializes collider components through the record playback module 420 based on the teaching assembling-disassembling record 201 for preparing to detect the virtual object's collision in virtual reality.

In step S24, the learning-end 21 plays the teaching assembling-disassembling record 201 through the record playback module 420 at the display 2100 of the learning virtual reality device 210 to reproduce the teacher's assembling-disassembling procedure.

Thus, the present disclosure may automatically reproduce the teaching assembling-disassembling record 201 and automatically build the virtual interactive environment for the student.

Figure 7:
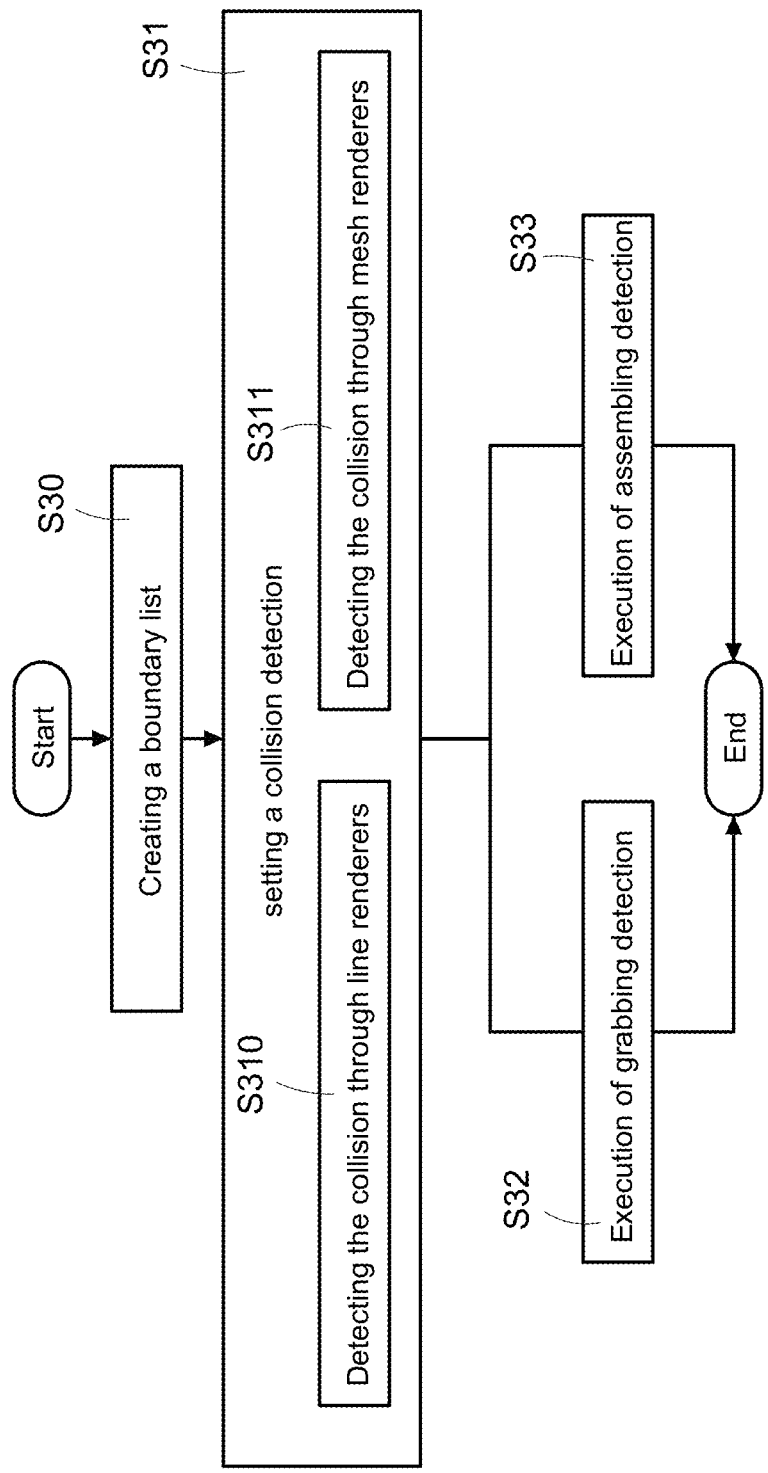
FIG. 7 illustrates a partial flowchart of an inspecting method of assembling and disassembling of one embodiment of the present disclosure.

Please refer to FIGS. 5 to 7. FIG. 7 illustrates a partial flowchart of an inspecting method of assembling and disassembling of one embodiment of the present disclosure.

In comparison with the inspection method of assembling and disassembling shown in FIG. 5, step S12 of the inspection method of assembling and disassembling in the embodiment of FIG. 5 may include steps S30 to S33 in the embodiment of FIG. 7.

In step S30, the learning-end 21 creates a boundary list through the learning interactive module 421. The above-mentioned boundary list is used to record a boundary of each virtual object. The present disclosure may determine whether each virtual object contacts or collides with another virtual object through detecting whether the boundary of each virtual object is overlapped.

In step S31, the learning-end 21 sets a collision detection to each virtual object through the learning interactive module 421 to detect whether a collision among the virtual objects occurs or to detect whether a collision between the virtual hand and any virtual object occurs (detection result of collision).

In one of the embodiments, the virtual objects may include a stroke (such as a 3D annotation), a wire (such as a cable), and a normal object (such as various components).

The present disclosure may execute different collision detections on different types of the virtual objects through steps S310 and S311, so as to improve the accuracy and the performance of the collision detection.

In step S310, when the virtual object is the wire or the stroke, the learning-end 21 detects the collision of the wire or the stroke through the learning interactive module 421 by using a line renderer. For example, to determine the boundary of the wire or the stroke based on the render boundary of the line renderer.

In step S311, when the virtual object is the normal object, the learning-end 21 computes the boundary of the normal object through the learning interactive module 421 by using a mesh renderer, and the learning-end 21 detects the collision of the normal object based on the boundary. For example, the learning-end 21 may determine the boundary of the normal object based on the renderer boundary of the mesh renderer.

In step S32, the learning-end 21 executes the grabbing detection through the learning interactive module 421 based on the detection result of collision detected in step S31.

In one of the embodiments, when the virtual hand collides with any virtual object, the learning-end 21 determines that the virtual hand grabs the virtual object and controls the grabbed virtual object to move with the virtual hand.

In one of the embodiments, when the virtual hand collides with any virtual object and a grab key is pressed, the learning-end 21 determines that the virtual hand grabs the virtual object and controls the grabbed virtual object to move with the virtual hand until the virtual object is detected to be put down (such as the grab key is released or is pressed again).

In step S33, the learning-end 21 executes the assembling detection through the learning interactive module 421 based on the detection result of collision detected in step S31.

In one of the embodiments, when the grabbed virtual object collides with another virtual object, the learning-end 21 assembles the collided virtual objects and controls the grabbed virtual object to be fixed in an assembling position.

In one of the embodiments, when one of the collided virtual objects is grabbed and then split from another collided virtual object, the learning-end 21 disassembles the separated virtual objects and controls the grabbed virtual object to move with the virtual hand.

In one of the embodiments, the determination of the above assembling and disassembling actions may only be performed when an assembly button and/or a disassembling button is triggered at the same time.

Thus, the present disclosure may provide the user to assemble and disassemble the virtual objects in virtual reality.

Figure 13:
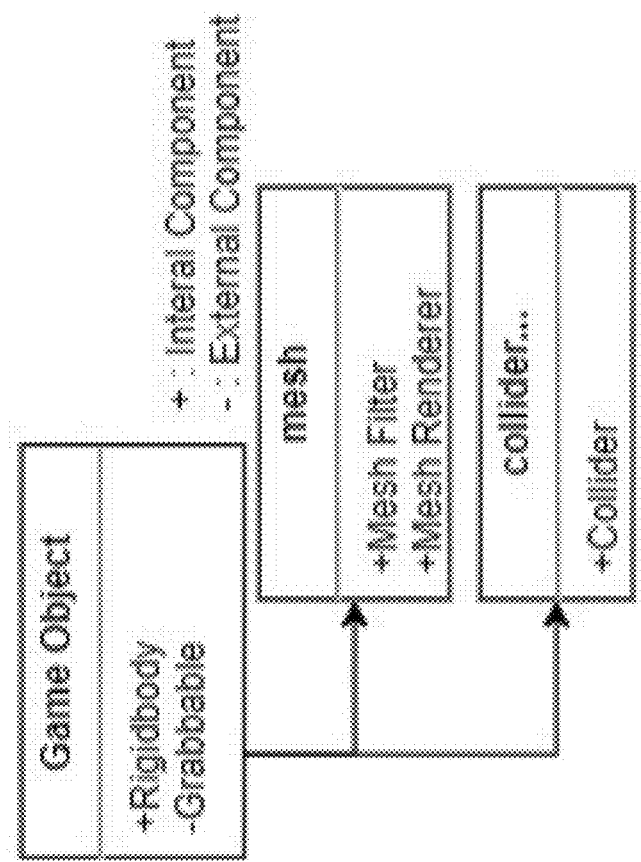
FIG. 13 illustrates a data structure of a virtual object of one embodiment of the present disclosure.

Please refer to FIG. 13. FIG. 13 illustrates a data structure of a virtual object of one embodiment of the present disclosure.

In one of the embodiments, the virtual objects (especially normal objects) have the data structure as shown in FIG. 13, wherein + represents an internal component and—represents an external component.

The main class of the virtual object (such as a game object) shown in FIG. 13 includes a rigid body component and a grabbable component. In other words, the virtual object has a rigid body attribute and a grabbable attribute, wherein the rigid body attribute is used to implement a collision effect.

The virtual object shown in FIG. 13 further includes a mesh sub-object and a collider sub-object. The mesh sub-object is used to express a renderer boundary. The collider sub-object is used to express a collision boundary.

Figure 14B:
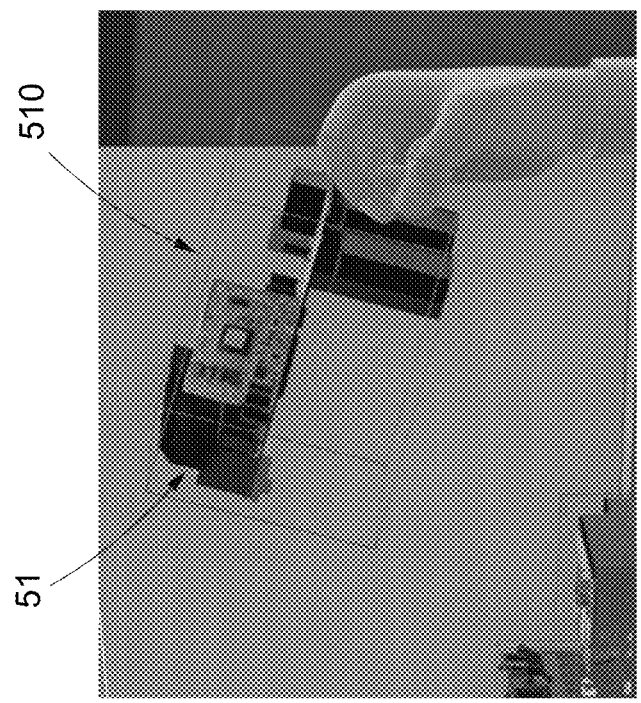
FIG. 14B illustrates a schematic view of a virtual hand grabbing a virtual object of one embodiment of the present disclosure.
Figure 14A:
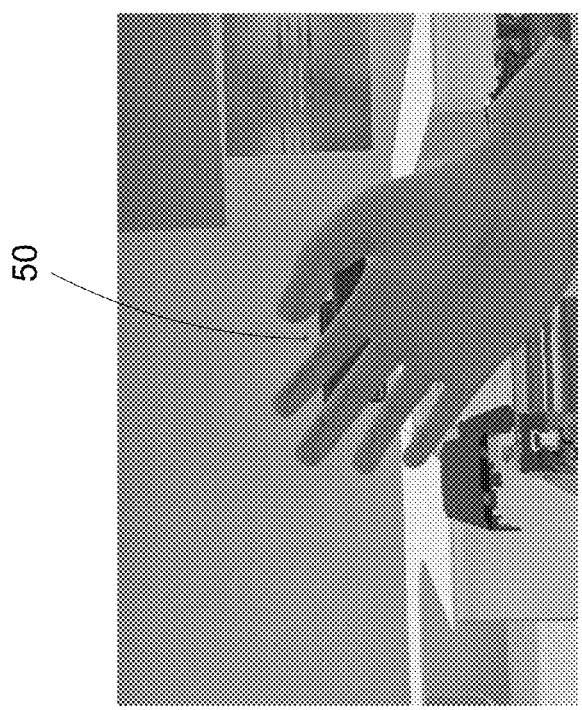
FIG. 14A illustrates a schematic view of a virtual hand of one embodiment of the present disclosure.

Please refer to FIGS. 14A and 14B. FIG. 14A illustrates a schematic view of a virtual hand of one embodiment of the present disclosure. FIG. 14B illustrates a schematic view of a virtual hand grabbing a virtual object of one embodiment of the present disclosure.

In order to allow the user to take and manipulate the virtual objects arbitrarily in virtual reality, the present disclosure may set an anchor point 50 of a virtual hand in the virtual reality. To detect whether the anchor point 50 is within a boundary (such as a bounding box 510) of the virtual object 51, the present disclosure may determine whether the virtual hand grabs the virtual object 51.

Figure 8:
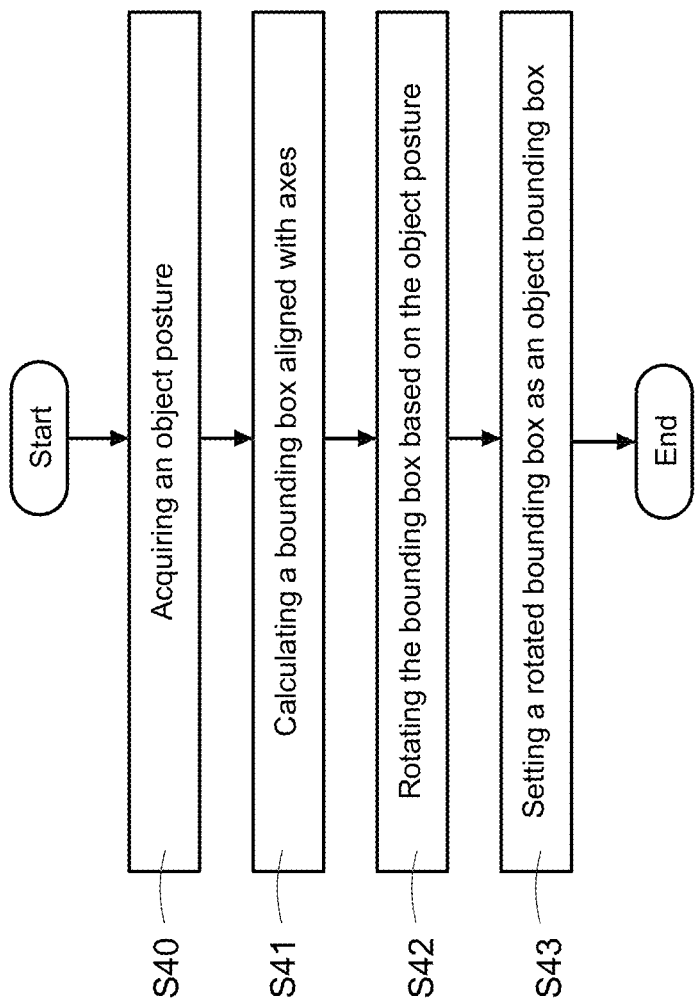
FIG. 8 illustrates a partial flowchart of an inspecting method of assembling and disassembling of one embodiment of the present disclosure.
Figure 15A:
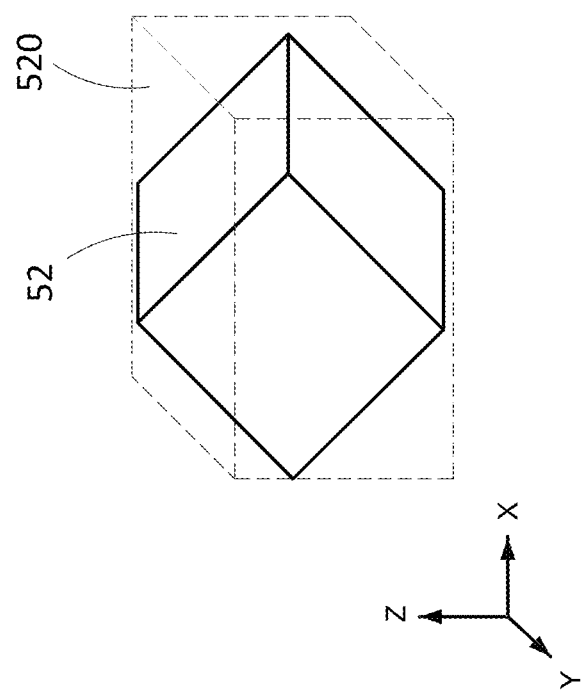
FIG. 15A illustrates a first schematic view of computing a bounding box of one embodiment of the present disclosure.
Figure 15B:
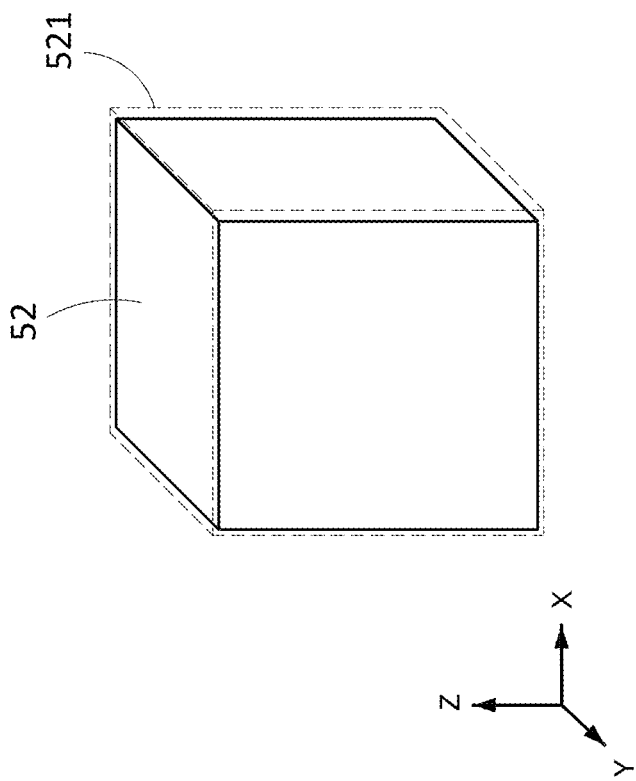
FIG. 15B illustrates a second schematic view of computing a bounding box of one embodiment of the present disclosure.
Figure 15D:
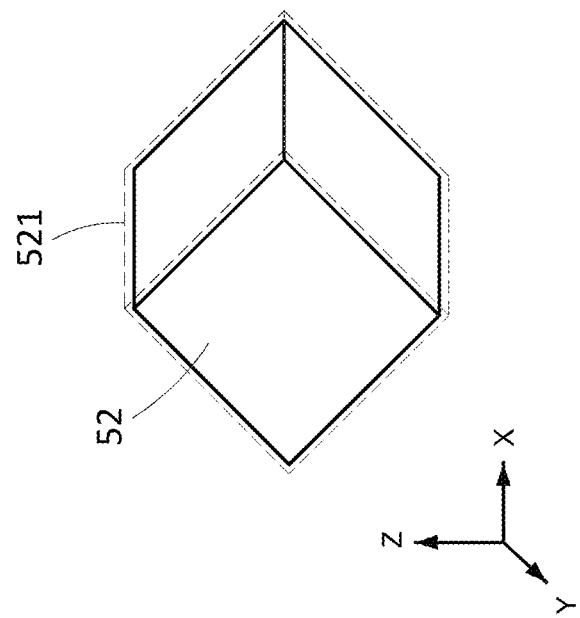
FIG. 15D illustrates a fourth schematic view of computing a bounding box of one embodiment of the present disclosure.
Figure 15C:
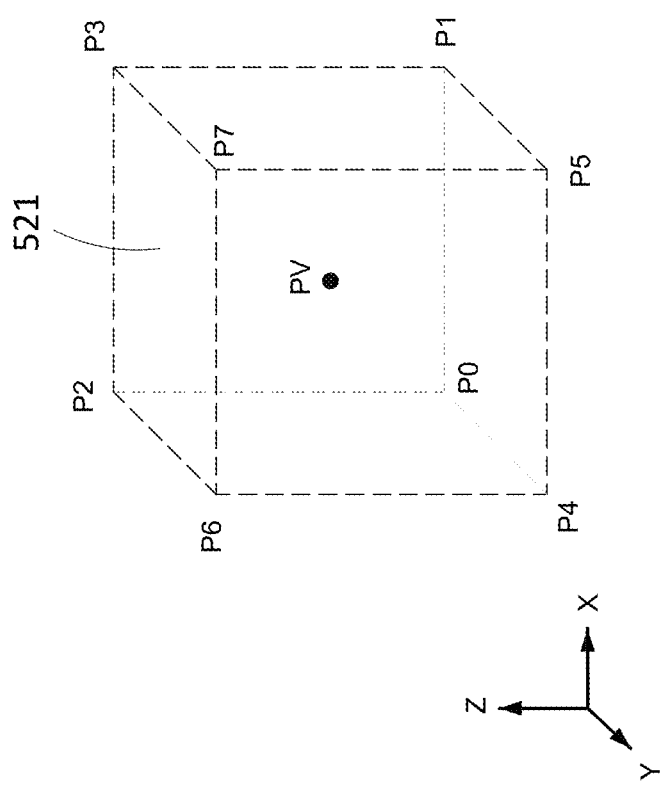
FIG. 15C illustrates a third schematic view of computing a bounding box of one embodiment of the present disclosure.

Please refer to FIG. 8 and FIGS. 15A to 15D. FIG. 8 illustrates a partial flowchart of an inspecting method of assembling and disassembling of one embodiment of the present disclosure. FIG. 15A illustrates a first schematic view of computing a bounding box of one embodiment of the present disclosure. FIG. 15B illustrates a second schematic view of computing a bounding box of one embodiment of the present disclosure. FIG. 15C illustrates a third schematic view of computing a bounding box of one embodiment of the present disclosure. FIG. 15D illustrates a fourth schematic view of computing a bounding box of one embodiment of the present disclosure.

As shown in FIG. 15A, in the 3D boundary algorithm of the related art, when the virtual object 52 rotated, the mesh boundary (bounding box 520) will be recalculated based on the maximum boundary. Therefore, the determination of the grabbing event may be inaccurate because there is an obvious gap between the bounding box 520 and the actual boundary of the virtual object 52.

Thus, the present disclosure further provides a 3D boundary calculating method. The method may continuously calculate the minimum bounding box of the virtual object 52 to be grabbed, such that the determination accuracy of the grabbing event is greatly improved.

The above 3D boundary calculating method may include steps S40-S43.

In step S40, the teaching-end 31 or the learning-end 21 acquires an object posture of the virtual object 52(such as the normal object). The above object posture may include a rotation angle. The rotation angle may be represented by Euler angles, but this specific example is not intended to limit the scope of the present disclosure.

In the embodiment shown in FIG. 15A, the virtual object 52 has a position BP (0, 0, 0), a rotating angle BR (0, 0, 45), and a size BS (2, 2, 2).

In step S41, the teaching-end 31 or the learning-end 21 computes a bounding box 521 aligned with axes of the virtual object 52. Namely, the bounding box 521 is computed corresponding to the virtual object 52 without any rotation.

In the embodiment shown in FIG. 15B, the bounding box 521 aligned with axes of the virtual object 52 may be obtained by the function "Quaternion.identity" provided by unity 3D, but this specific example is not intended to limit the scope of the present disclosure.

In step S42, the teaching-end 31 or the learning-end 21 rotates the bounding box 521 based on the object posture to obtain a rotated bounding box 521.

In the embodiment shown in FIG. 15C, the teaching-end 31 or the learning-end 21 may compute the vectors of the vertexes P0 to P7 of the bounding box 521 aligned with axes and rotate the bounding box 521 aligned with axes through these vectors to obtain the rotated bounding box 521.

In step S43, the teaching-end 31 or the learning-end 32 sets the rotated bounding box 521 as an object bounding box of the virtual object 52 (such as a normal object). The above object bounding box is regarded as a collision boundary of the virtual object 52, and the object bounding box is used to detect the collision events of the virtual object 52. For example, the teaching-end 31 or the learning-end 32 may determine that the virtual object 52 collides with another virtual object when another virtual object enters the collision boundary of the virtual object 52.

For instance, as shown in FIG. 15C, when the anchor point PV of the virtual hand enters the object bounding box of the virtual object 52, the teaching-end 31 or the learning-end 32 may determine that the virtual hand collides with the virtual object 52.

Figure 9:
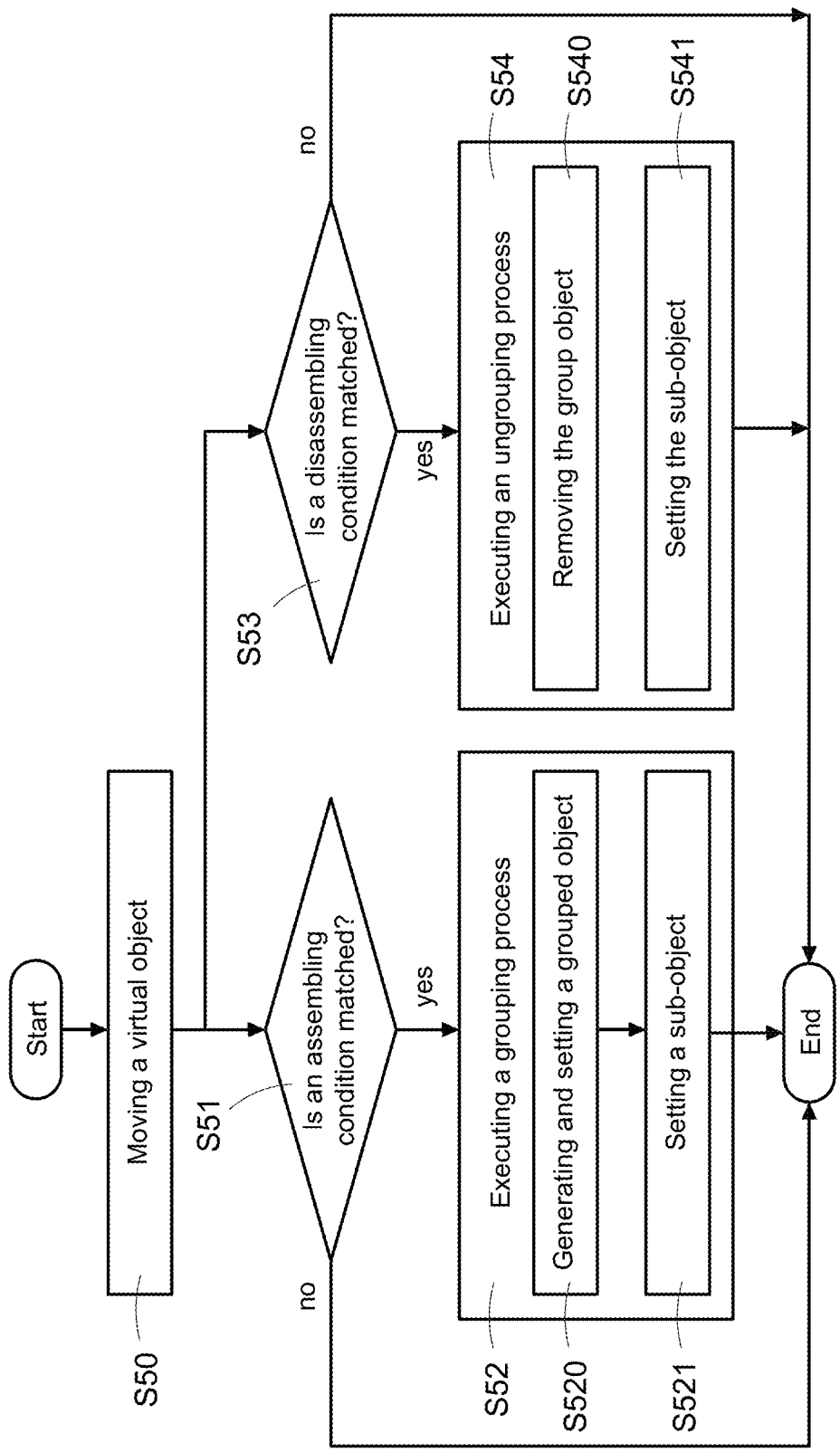
FIG. 9 illustrates a partial flowchart of an inspecting method of assembling and disassembling of one embodiment of the present disclosure.

Please refer to FIGS. 5 to 9. FIG. 9 illustrates a partial flowchart of an inspecting method of assembling and disassembling of one embodiment of the present disclosure.

In comparison with the inspection method of assembling and disassembling as shown in FIG. 5, the inspection method of assembling and disassembling as shown in FIG. 9 may include steps S50-S54 for achieving a function of assembling and disassembling.

In step S50, the teaching-end 31 or the learning-end 21 may receive a moving operation from the user to move the virtual objects grabbed by the virtual hand through the teaching virtual reality device 310 or the learning virtual reality device 210.

Next, the teaching-end 31 or the learning-end 21 may perform step S51 and step S53.

In step S51, the teaching-end 31 or the learning-end 21 may detect whether a preset assembling condition is matched.

In one of the embodiments, the assembling condition includes the virtual object grabbed by the virtual hand colliding with another virtual object.

In one of the embodiments, the assembling condition includes an assembling button of the console 3101 or the console 2101 being pressed.

If the assembling condition is unmatched, the teaching-end 31 or the learning-end 21 may terminate this detection.

If the assembling condition is matched, the teaching-end 31 or the learning-end 21 may perform step S52. In step S52, the teaching-end 31 or the learning-end 21 may execute a grouping process to assemble the virtual objects collided with each other into a group object (such as a first group object).

In one of the embodiments, the grouping process may include steps S520 and S521.

In step S520, the teaching-end 31 or the learning-end 21 may generate a grabbable group object and set the collided virtual objects to be sub-objects of this group object.

In step S521, the teaching-end 31 or the learning-end 21 may set the sub-objects of the group object to be not grabbable.

Figures 16A, 16B:
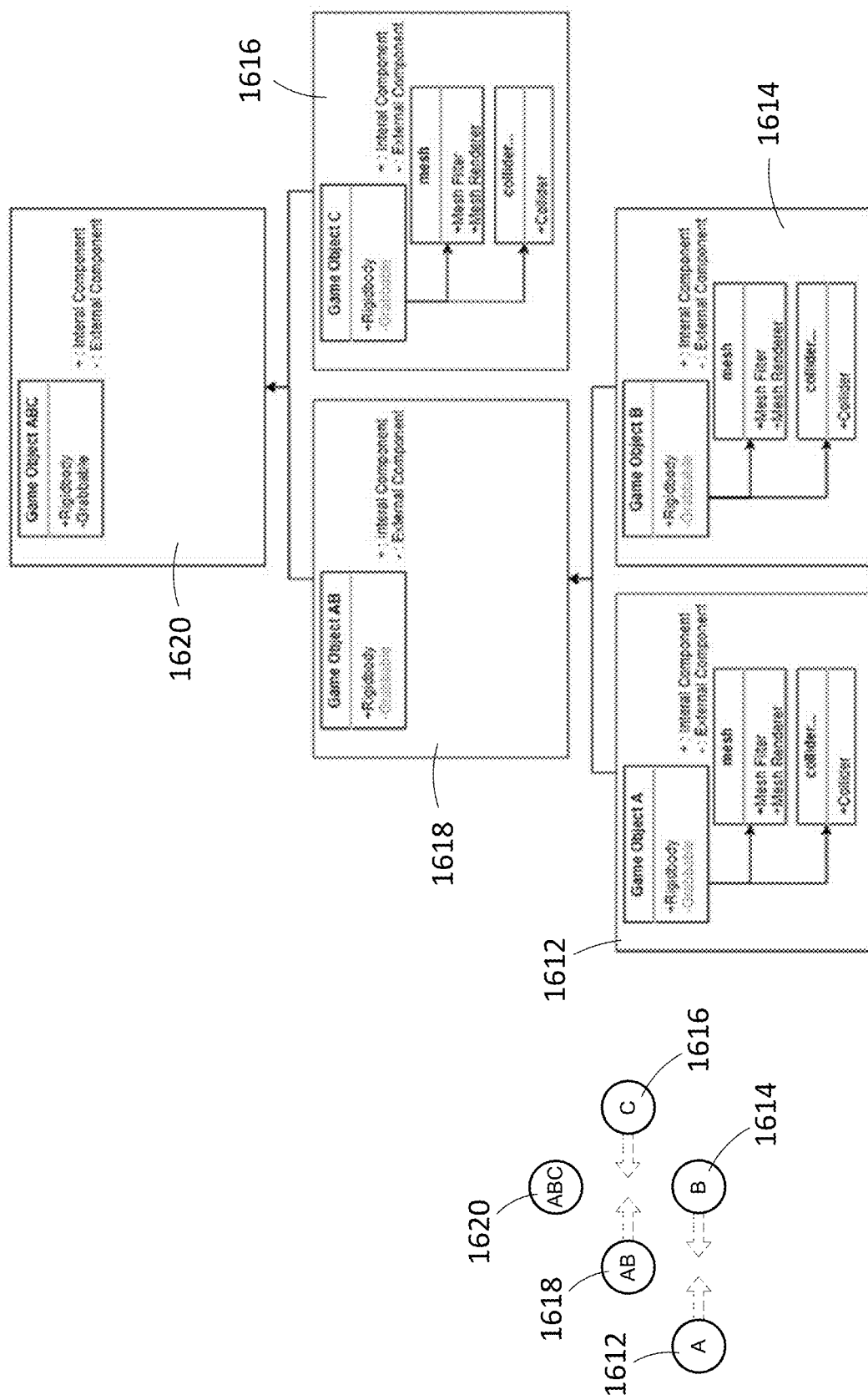
FIG. 16A illustrates a first schematic view of a grouping process of one embodiment of the present disclosure.
FIG. 16B illustrates a data structure after a grouping process of one embodiment of the present disclosure.

Please refer to FIGS. 16A to 16B. FIG. 16A illustrates a first schematic view of a grouping process of one embodiment of the present disclosure. FIG. 16B illustrates a data structure after a grouping process of one embodiment of the present disclosure.

As shown in FIGS. 16A and 16B, three virtual objects 1612, 1614, and 1616 respectively labeled A, B, and C) are provided. The user may assemble these virtual objects 1612, 1614, and 1616 sequentially.

When the virtual object 1612 (labeled A) contact with the virtual object 1614 (labeled B), their collider objects generate a collision detection enter. Therefore, a new virtual object 1618 (which is group object AB) is created.

As shown in FIG. 16B, the grabbable component is added to the newly created virtual object 1618 (i.e. a group object AB). The virtual object 1612 (labeled A) and the virtual object 1614 (labeled B) become the sub-objects of the virtual object 161 (i.e., the group object AB).

The grabbable components of the virtual object 1612 (labeled A) and the virtual object 1614 (labeled B) are set to be invalid to stop detecting the grabbing actions.

Next, when the virtual object 161S (i.e., the group object AB) contacts with the virtual object 1616 (labeled C), a setting similar to the above description may be executed and a virtual object 1620 (i.e., a group object ABC) may be created.

Thus, the tree view of the group objects will grow from bottom to top. Moreover, when a new group object is created, only the grabbable component of the top node (such as the virtual object 1620 (labeled ABC) shown in FIG. 16A) will be active.

Figure 17A:
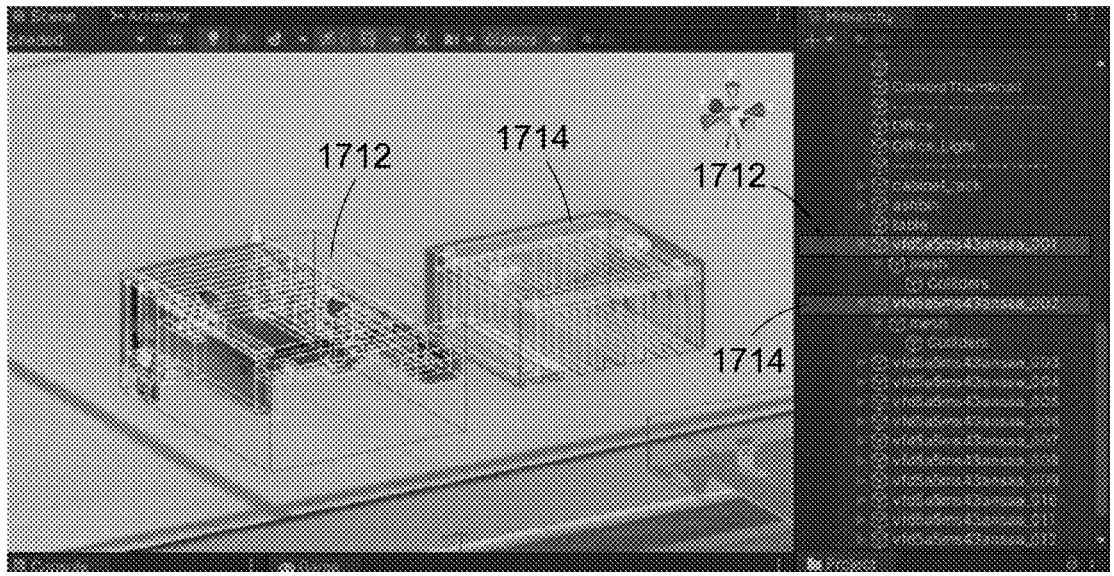
FIG. 17A illustrates a second schematic view of a grouping process of one embodiment of the present disclosure.
Figure 17B:
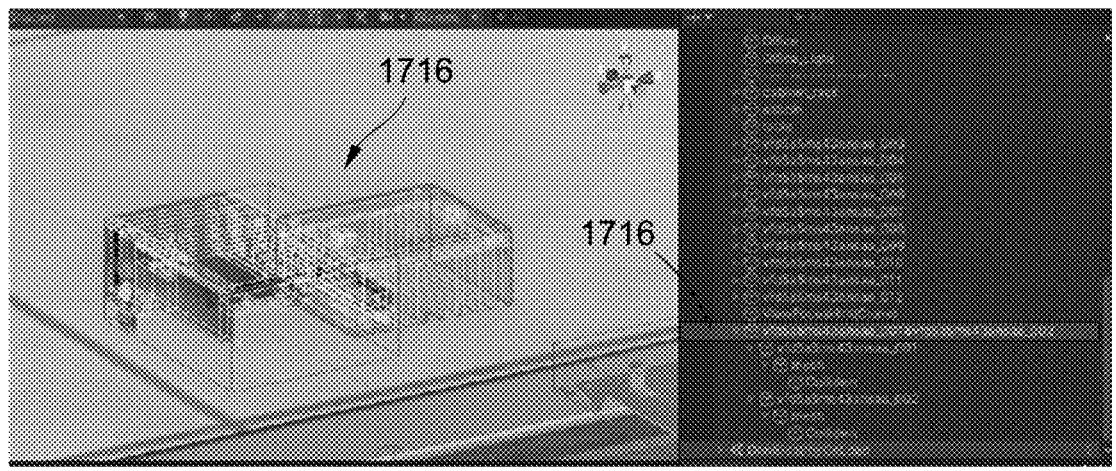
FIG. 17B illustrates a third schematic view of a grouping process of one embodiment of the present disclosure.

Please refer to FIGS. 17A and 17B. FIG. 17A illustrates a second schematic view of a grouping process of one embodiment of the present disclosure. FIG. 17B illustrates a third schematic view of a grouping process of one embodiment of the present disclosure.

As shown in FIG. 17A, the normal object includes a mesh object and a collider object. When two virtual objects contact with each other, the grouping process is executed. Namely, when two collision zones (white grid areas) of the two virtual objects 1712 and 1714 (vfd5a5ms43ansaa_001 and vfd5a5ms43ansaa_002) overlap, the grouping process is executed.

As shown in FIG. 17B, after a determination of grouping is made, a new group object 1716 (vfd5a5ms43ansaa_001&vfd5a5ms43ansaa 002) is created. The two virtual objects 1712 and 1714 (vfd5a5ms43ansaa_001 and vfd5a5ms43ansaa_002) are set to be in sub-level of the new group object 1716, and the grabbable components of the two sub-level virtual objects (i.e., the virtual objects 1712 and 1714) are inactive.

Moreover, a grabbable component of the new group object merges the collision zones of all sub-objects into a new collision zone (the white grid area in the FIG.). In addition, the grabbable zone (the grey grid area in the FIG.) is set by an approach similar to the collision zone.

Please refer to FIG. 9 again. In step S53, the teaching-end 31 or the learning-end 21 detects whether a preset disassembling condition is matched.

In one of the embodiments, the disassembling condition includes the virtual object grabbed by the virtual hand leaving from another virtual object originally contacted.

In one of the embodiments, the disassembling condition includes a disassembling button of the console 3101 or the console 2101 being pressed.

If the disassembling condition is unmatched, the teaching-end 31 or the learning-end 21 terminates this detection.

If the disassembling condition is matched, the teaching-end 31 or the learning-end 21 performs step S54. In step S54, the teaching-end 31 or the learning-end 21 executes an ungrouping process to split a group object (such as a second group object) into multiple virtual objects.

In one of the embodiments, the ungrouping process includes steps S540 and S541.

In step S540, the teaching-end 31 or the learning-end 21 removes links between the multiple sub-objects of the group object; therefore, removing the group object.

In step S541, the teaching-end 31 or the learning-end 21 set the multiple sub-objects as multiple grabbable virtual objects.

Figure 18A:
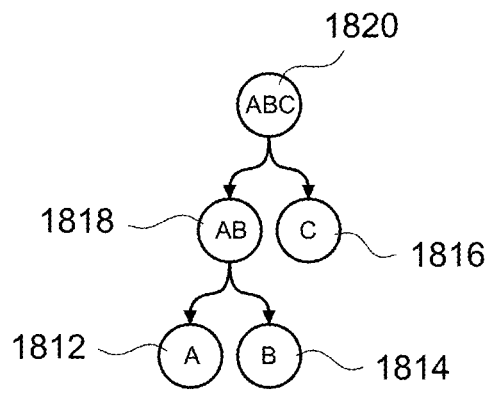
FIG. 18A illustrates a first schematic view of an ungrouping process of one embodiment of the present disclosure.
Figure 18B:
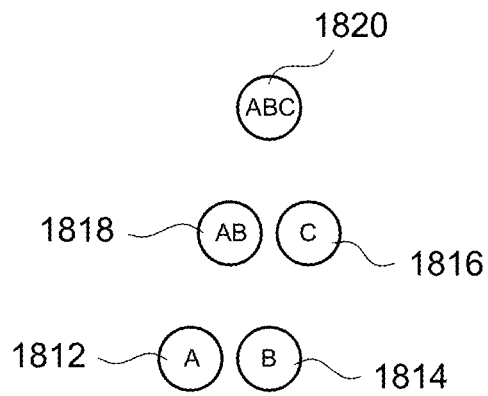
FIG. 18B illustrates a second schematic view of an ungrouping process of one embodiment of the present disclosure.
Figure 18C:
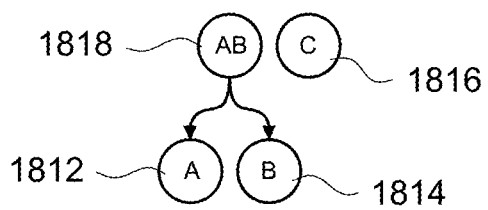
FIG. 18C illustrates a third schematic view of an ungrouping process of one embodiment of the present disclosure.
Figure 19:
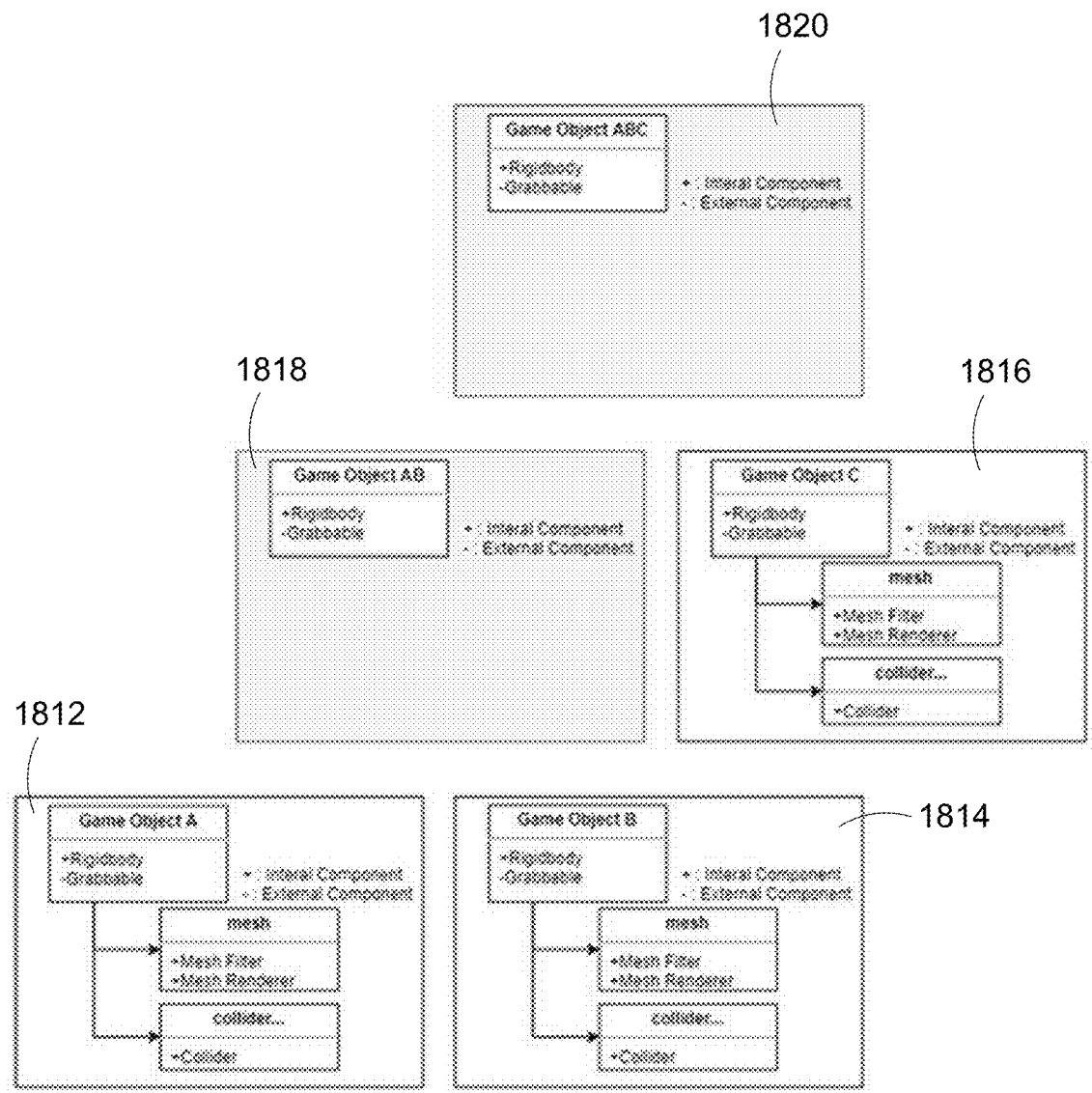
FIG. 19 illustrates a fourth schematic view of an ungrouping process of one embodiment of the present disclosure.

Please refer to FIGS. 18A to 19. FIG. 18A illustrates a first schematic view of an ungrouping process of one embodiment of the present disclosure. FIG. 18B illustrates a second schematic view of an ungrouping process of one embodiment of the present disclosure. FIG. 18C illustrates a third schematic view of an ungrouping process of one embodiment of the present disclosure. FIG. 19 illustrates a fourth schematic view of an ungrouping process of one embodiment of the present disclosure.

As shown in FIGS. 18A to 18C and 19, when an ungrouping event occurs to the group object 1820 (labeled ABC), all the grabbable components of non-original virtual objects are removed. On the other hand, the original virtual objects may be removed from a parent object level and enter a selectable state. In the embodiment, the original virtual objects may be the virtual object 1812 (labeled the virtual object 1814 (labeled B), and the virtual object 1816. (labeled C), and the non-original object may be the group object 1818 (labeled AB) and the group object 1820 (labeled ABC).

The above selectable state enables the virtual objects to stop the grabbable function, so that the user may select the virtual object to be split and drag the selected virtual object out for ungrouping.

Taking splitting the virtual object 1816 (labeled C), as an example, when the disassembling condition is matched, the virtual object 1816 (labeled C), may be split from the group object 1820 (labeled ABC). Meanwhile, the virtual object 1812 (labeled A) and the virtual object 1814 (labeled B) are grouped as the group object 1818 (labeled AB) because the distance between the virtual object 1812 (labeled A) and the virtual object 1814 (labeled B) remains unchanged.

Figure 20A:
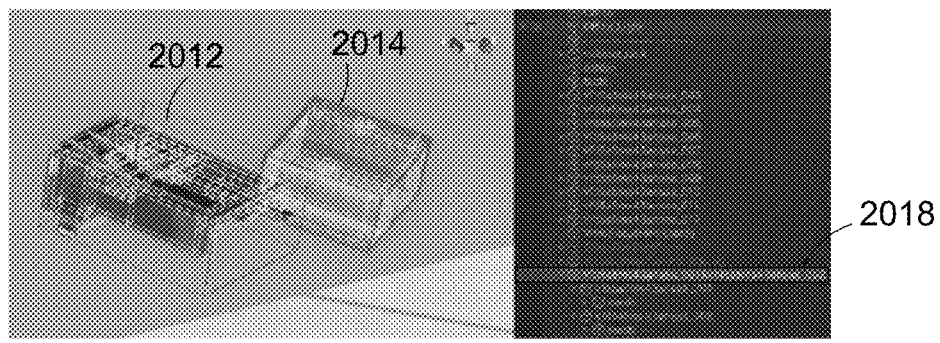
FIG. 20A illustrates a data structure after an ungrouping process of one embodiment of the present disclosure.
Figure 20B:
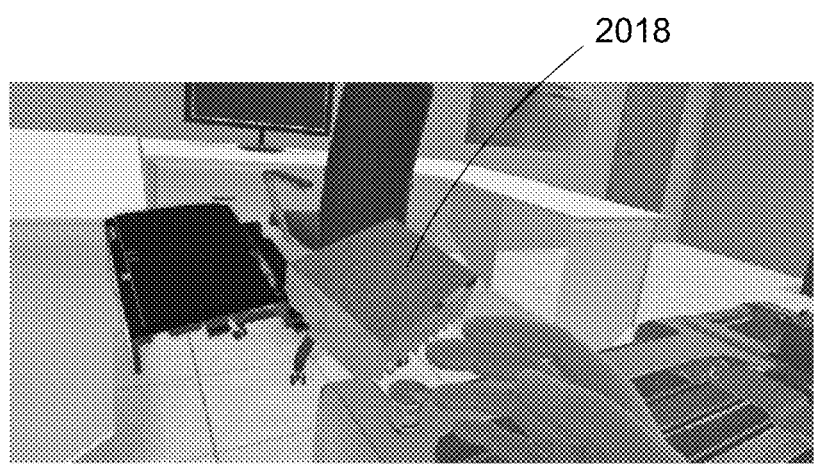
FIG. 20B illustrates a sixth schematic view of an ungrouping process of one embodiment of the present disclosure.
Figure 20C:
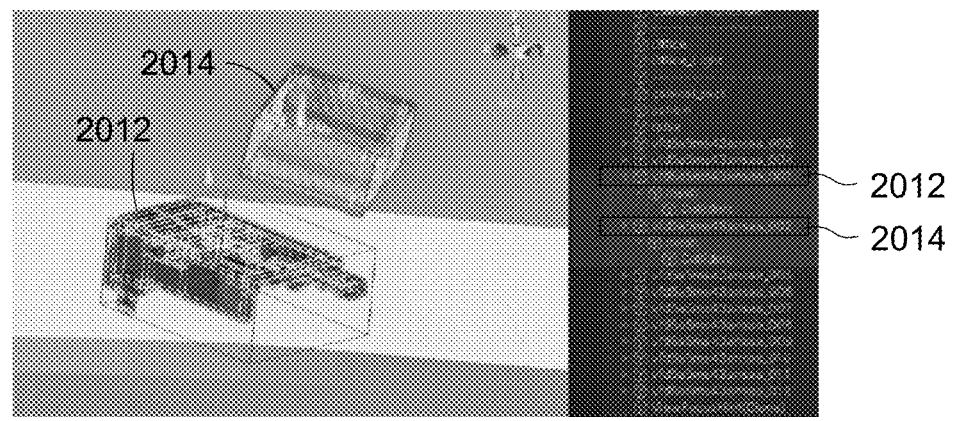
FIG. 20C illustrates a seventh schematic view of an ungrouping process of one embodiment of the present disclosure.

Please refer to FIGS. 20A to 20C. FIG. 20A illustrates a data structure after an ungrouping process of one embodiment of the present disclosure. FIG. 20B illustrates a sixth schematic view of an ungrouping process of one embodiment of the present disclosure. FIG. 20C illustrates a seventh schematic view of an ungrouping process of one embodiment of the present disclosure.

As shown in FIG. 20A, when the determination of assembling the two virtual objects 2012 and 2014 (vfd5a5ms43ansaa_001 and vfd5a5ms43ansaa_002) is made, a new group object 2018 (vfd5a5ms43ansaa_001&vfd5a5ms43ansaa_002) is created, and the two virtual objects 2012 and 2014 are set to be the sub-objects of the new group object 2018.

When the user wants to ungroup the group object 2018 (vfd5a5ms43ansaa_001&vfd5a5ms43ansaa_002), the user may click the group object Therefore, the system may disassociate the parent object level of the two virtual objects and remove the parent object (i.e., the group object).

Next, as shown in FIG. 20B, the user may further select the virtual object(s) 2018 to be split and move it out.

Finally, as shown in FIG. 20C, the two virtual objects 2012 and 2014 (vfd5a5ms43ansaa_001 and vfd5a5ms43ansaa_002) recover to a pre-group state.

The present disclosure may implement assembling and disassembling of the virtual objects 2012 and 2014 in virtual reality through the above grouping process and the above ungrouping process.

Figure 10:
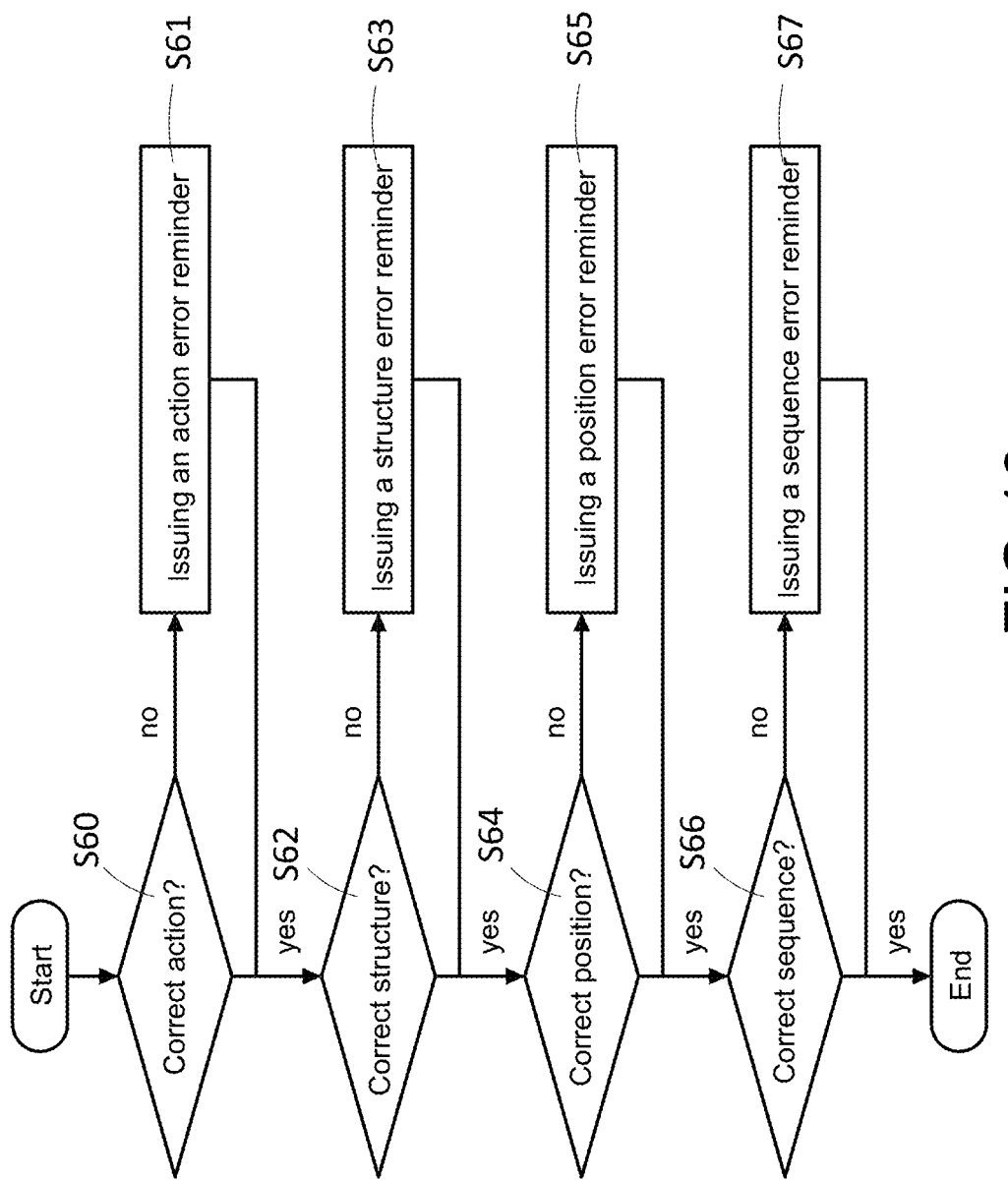
FIG. 10 illustrates a partial flowchart of an inspecting method of assembling and disassembling of one embodiment of the present disclosure.

Please refer to FIGS. 5 to 10. FIG. 10 illustrates a partial flowchart of an inspecting method of assembling and disassembling of one embodiment of the present disclosure.

In comparison with the inspection method of assembling and disassembling as shown in FIG. 5, steps S14 and S15 of the inspection method of assembling and disassembling in the embodiment of FIG. 5 may include steps S60 to S70 in the embodiment of FIG. 10.

In step S60, the learning-end 21 detects whether the student's actions are correct or incorrect through the inspection execution module 423.

In one of the embodiments, the inspection data 202 may include a corresponding action type of each checkpoint, such as an assembling action or a disassembling action. The learning-end 21 may detect whether the current action is consistent or inconsistent with the inspection data 202 through the inspection execution module 423.

When the action is correct, the learning-end 21 performs step S62.

When the action is incorrect, the learning-end 21 performs step S61. In step S61, the learning-end 21 issues an action error reminder through the inspection execution module 423.

In step S62, the learning-end 21 detects whether the structure of the virtual objects currently made by the student is correct or incorrect through the inspection execution module 423.

In one of the embodiments, the inspection data 202 may record a structure tree of each group object (as shown in FIGS. 16A and 16B) at each checkpoint. The learning-end 21 may detect whether the current structure of the virtual objects is consistent or inconsistent with the inspection data 202 through the inspection execution module 423.

When the structure is correct, the learning-end 21 performs step S64.

When the structure is incorrect, the learning-end 21 performs step S63. In step S63, the learning-end 21 issues a structure error reminder through the inspection execution module 423.

In step S64, the learning-end 21 detects whether each current position of each virtual object is correct or incorrect through the inspection execution module 423.

In one of the embodiments, the inspection data 202 may record the position of each virtual object at each checkpoint. The learning-end 21 may detect whether the current position of each virtual object is consistent or inconsistent with the inspection data 202 through the inspection execution module 423

In one of the embodiments, different assembling habits of the students are considered, wherein some people are used to first assemble the virtual objects into a group object on the right-hand side and then move the group object to the current position, some people are used to assemble the virtual objects into a group object on the left-hand side. To exclude the misjudgment of the wrong position caused by the different assembling habits, one embodiment of the present disclosure provides a detection based on the relative positions among the virtual objects.

Figure 21:
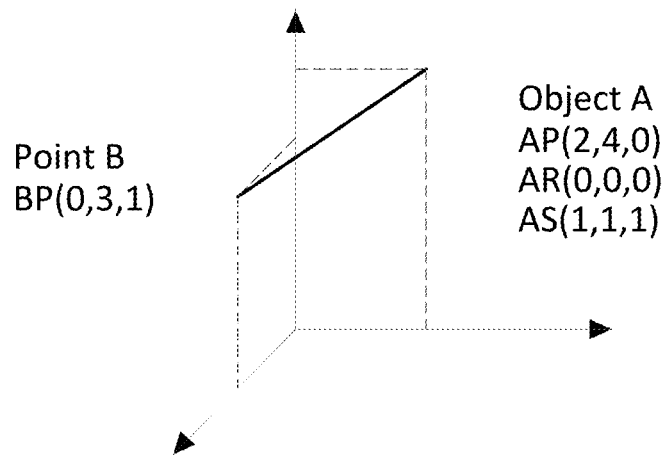
FIG. 21 illustrates a schematic view of computing relative position of one embodiment of the present disclosure.
Figure 22:
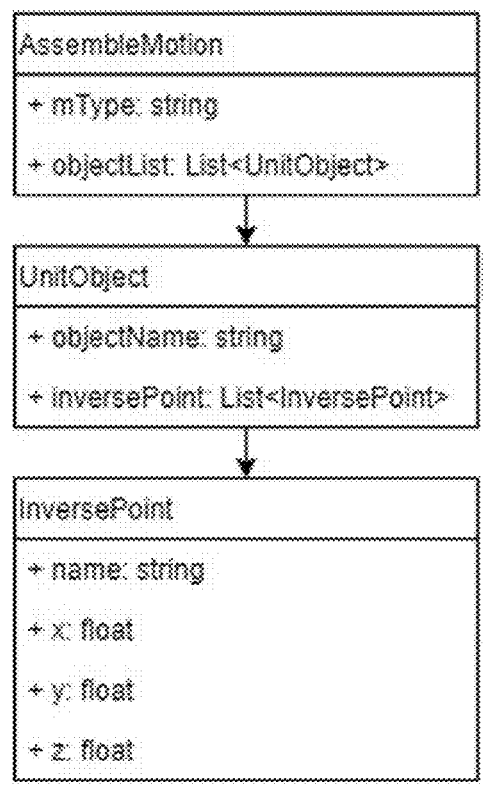
FIG. 22 illustrates a data structure of a relative position of one embodiment of the present disclosure.
Figure 23:
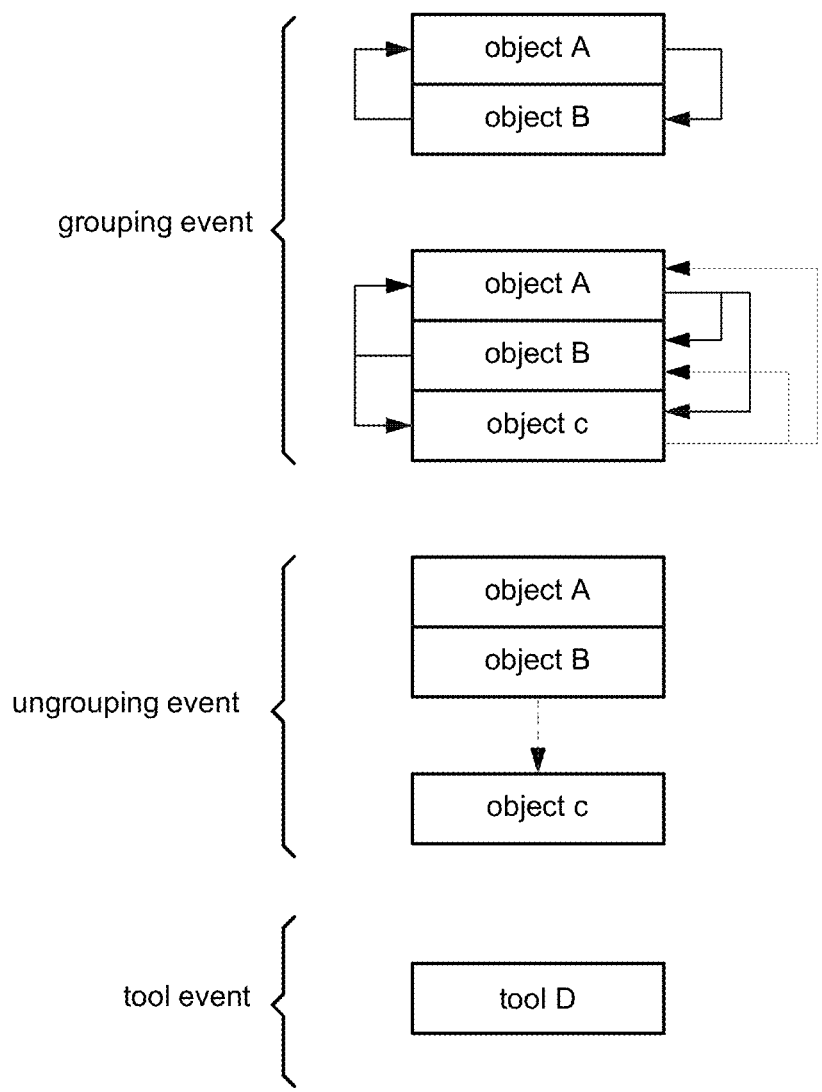
FIG. 23 illustrates a schematic view of recording a grouping event, an ungrouping event, and a tool event of one embodiment of the present disclosure.

Please refer to FIGS. 21 to 23. FIG. 21 illustrates a schematic view of computing relative position of one embodiment of the present disclosure. FIG. 22 illustrates a data structure of a relative position of one embodiment of the present disclosure. FIG. 23 illustrates a schematic view of recording a grouping event, an ungrouping event, and a tool event of one embodiment of the present disclosure.

In order to acquire the relative positions of a virtual object A and a virtual object B (i.e., object A and point B as shown in FIG. 21), the present disclosure may compute a relative position of the virtual object B to virtual object A.

Moreover, the position, the rotating angle, and the object size of the virtual object A should be considered simultaneously because the position, the rotating angle, and the object size of the virtual object A may change a final value of the relative position.

For an instance, the position of the virtual object B is BP (0, 3, 1). The virtual object A has a position AP (2, 4, 0), a rotating angle AR (0, 0, 0), and an object size AS (1, 1, 1). The above relative position may be a relative position coordinates (−2, 1, −1) obtained by subtracting the position AP (2,4,0) from the position BP (0,3,1).

As shown in FIG. 22, the present disclosure further provides an assembling format used to record and store the relative position coordinates between two virtual objects.

As shown in FIG. 23, when the grouping event occurs, such as the virtual object A and the virtual object B are grouped into the group object AB, the present disclosure may first focus on the virtual object A and calculate a relative position of the virtual object B to the virtual object A. Next, the present disclosure may focus on the virtual object B and calculate a relative position of the virtual object A to the virtual object B, and so on.

For another instance, the present disclosure may first focus on the virtual object A and then calculate the relative positions of the virtual object B and the virtual object C to the virtual object A. Next, the present disclosure may focus on the virtual object B and then calculate the relative positions of the virtual object A and the virtual object C to the virtual object B. Finally, the present disclosure may focus on the virtual object C and calculate the relative positions of the virtual object A and the virtual object B to the virtual object C.

When an ungrouping event occurs, such as the group object ABC are ungrouped into the group object AB and the virtual object C, the present disclosure may remove all the relative positions to recover the virtual object A, the virtual object B, and the virtual object C to be independent virtual objects. In addition, the present disclosure executes the grouping event on the virtual object A and the virtual object B to calculate the relative positions of the virtual object A and the virtual object B.

When a tool event occurs, the present disclosure may record the position of a tool D as shown in FIG. 23.

If the detected position is correct, the learning-end 21 performs step S66.

If the detected position is incorrect, the learning-end 21 performs step S65. In step S65, the learning-end 21 issues a position error reminder through the inspection execution module 423.

In step S66, the learning-end 21 detects whether the assembling sequence of any virtual object is incorrect through the inspection execution module 423.

In one embodiment, the inspection data 202 may record the assembling sequence of each virtual object at each checkpoint. The learning-end 21 may detect whether the assembling sequence of the current virtual object is consistent or inconsistent with the inspection data 202 through the inspection execution module 423.

If the assembling sequence is correct, the learning-end 21 terminates the detection.

If the assembling sequence is incorrect, the learning-end 21 performs step S67. In step S67, the learning-end 21 issues a sequence error reminder through the inspection execution module 423.

Please be noted that there has no order relationship among the action inspection of steps S60 and S61, the structure inspection of steps S62 and S63, the position inspection of steps S64 and S65, and the sequence inspection of steps S66 and S67 in the present embodiment. An inspection order or an inspection content may be modified according to the user's requirement (such as deleting the structure inspection).

Figures 11, 12:
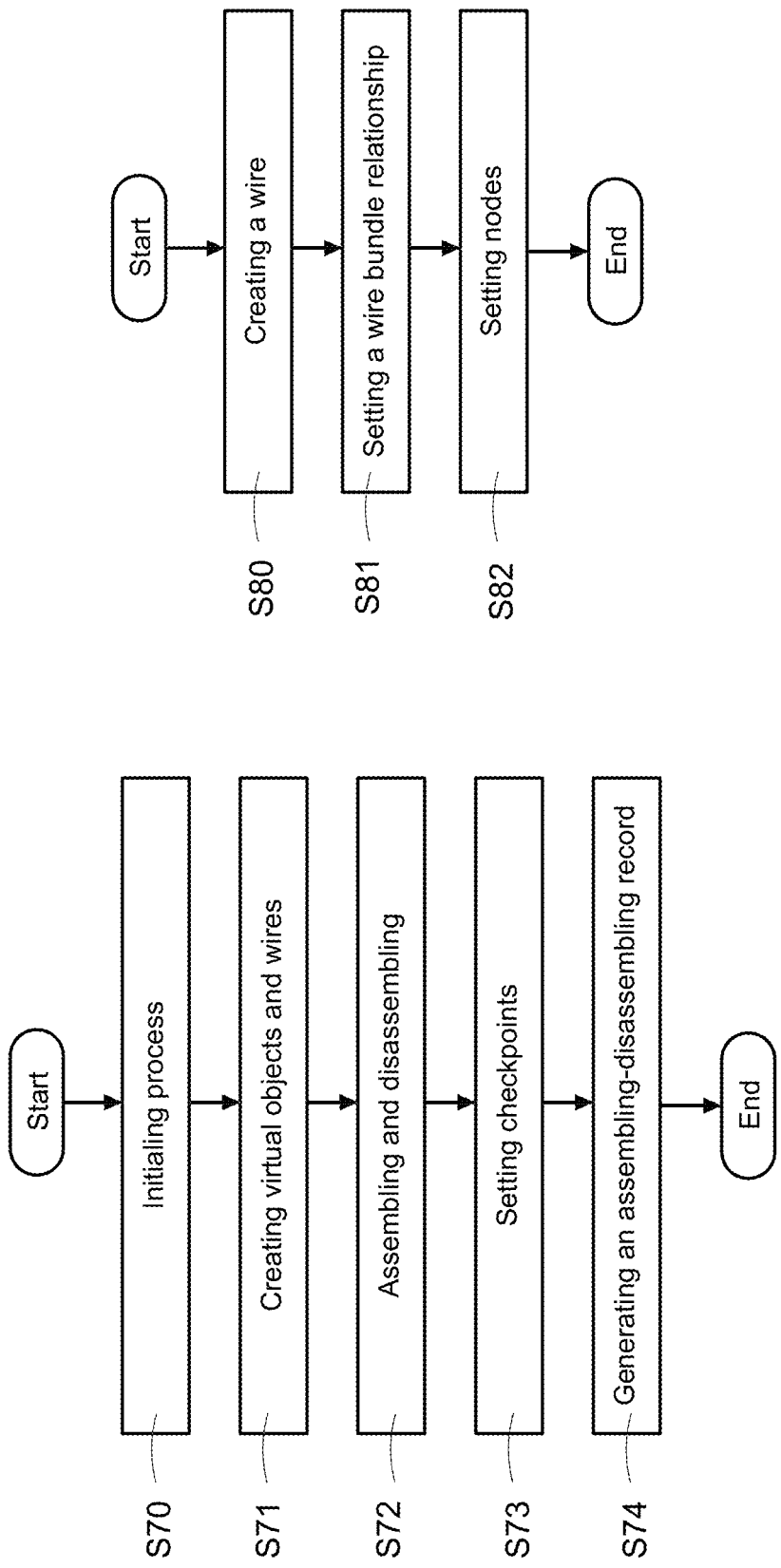
FIG. 11 illustrates a partial flowchart of an inspecting method of assembling and disassembling of one embodiment of the present disclosure.
FIG. 12 illustrates a partial flowchart of an inspecting method of assembling and disassembling of one embodiment of the present disclosure.

Please refer to FIGS. 5 to 11. FIG. 11 illustrates a partial flowchart of an inspecting method of assembling and disassembling of one embodiment of the present disclosure.

In comparison with the inspection method of assembling and disassembling of FIG. 5, the inspection method of assembling and disassembling of this embodiment further includes steps S70 to S74 used to generate a teaching assembling-disassembling record 201 at the teaching-end 31.

In step S70, the teaching-end 31 executes an initialing process.

In one of the embodiments, the initialing process may be same as or similar to the process shown in steps S20 to S23 of FIG. 6.

In step S71, the teaching-end 31 receives a teacher's operations through the teaching virtual reality device 310 and creates one or more virtual object(s) and one or more wire(s) based on the operations.

In one of the embodiments, the teacher may perform an object-creating operation to create one or more virtual object(s).

In one of the embodiments, the teacher may perform a wire-creating operation to create a wire that is used to link the virtual objects.

For an instance, when the virtual objects are virtual electronic equipment, the teacher may create at least one wire to link the virtual objects, so as to connect the virtual electronic equipment under simulation.

In step S72, the teaching-end 31 receives a teacher's operation (such as a teaching assembling-disassembling operation) through the teaching virtual reality device 310 and modifies the teaching assembling-disassembling status of the virtual objects based on the teaching assembling-disassembling operation.

More specifically, after the virtual objects and the wires are created, the teacher may operate the teaching virtual reality device 310 to demonstrate the assembling-disassembling procedure through the virtual objects and the wires.

Moreover, during demonstrating the assembling-disassembling procedure, the teaching assembling-disassembling status of the virtual objects may keep changing, and the teaching-end 31 may continuously record the changes of the teaching assembling-disassembling status of the virtual objects.

In step S73, the teaching-end 31 sets the checkpoints and records each teaching assembling-disassembling status at each checkpoint.

In step S74, when the demonstration of the assembling-disassembling procedure is finished, the teaching-end 31 may generate a teaching assembling-disassembling record. Next, the teaching-end 31 may release the teaching assembling-disassembling record to the server-end 20.

Thus, the present disclosure may enable the teacher to quickly generate the teaching assembling-disassembling records.

Please refer to FIGS. 5 to 12. FIG. 12 illustrates a partial flowchart of an inspecting method of assembling and disassembling of one embodiment of the present disclosure.

In comparison with the inspection method of assembling and disassembling shown in FIG. 11, the inspection method of assembling and disassembling of this embodiment shown in FIG. 12 includes steps S80 to S82 used to generate a virtual wire for the step S71 of FIG. 11.

In step S80, the teacher may perform a wire-creating operation through the teaching-end 31; therefore, the teaching-end 31 may create a wire having consistent nodes based on a head node number, a body node number, and a tail node number of the wire-creating operation.

In one of the embodiments, the above-mentioned wire-creating operation includes setting the head node number, the body node number, and the tail node number.

In one of the embodiments, the head nodes and the tail nodes are used to connect the virtual object(s) for satisfying a wiring requirement.

Figures 24, 25:
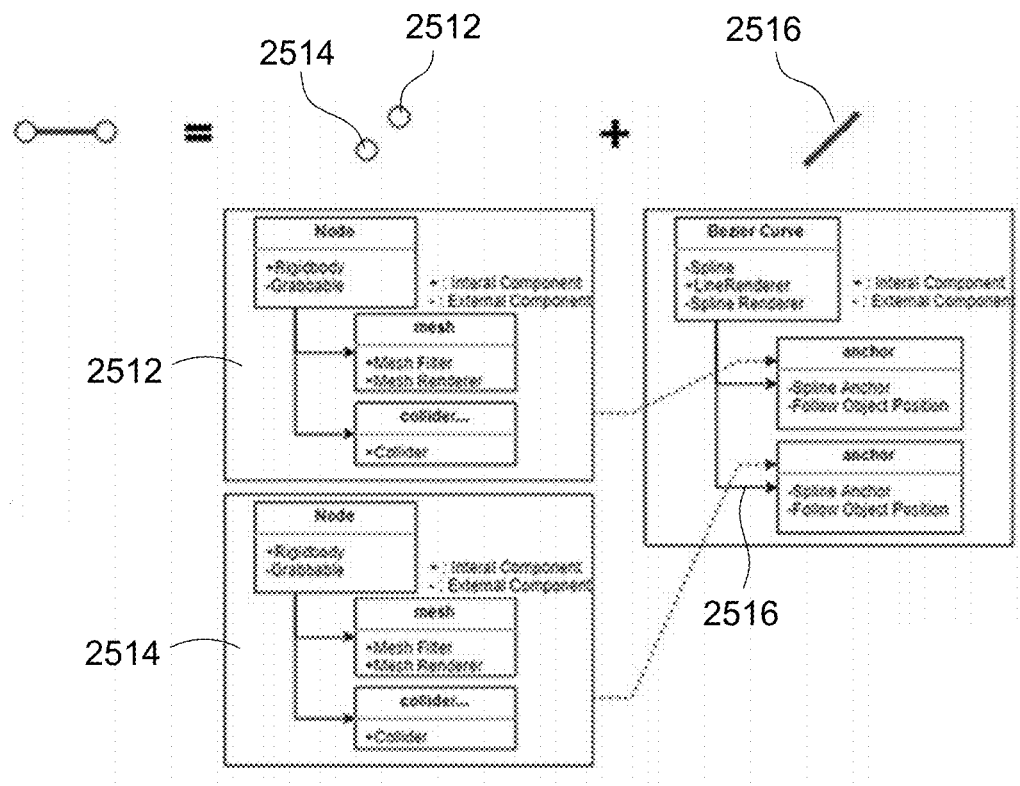
FIG. 24 illustrates a schematic view of wire types of one embodiment of the present disclosure.
FIG. 25 illustrates a data structure of a wire of one embodiment of the present disclosure.

Please refer to FIG. 24. FIG. 24 illustrates a schematic view of wire types of one embodiment of the present disclosure.

In this embodiment, the wire may be a one-to-one wire, a one-to-many wire, a many-to-one wire, or a many-to-many wire. The one-to-one wire has a head node number being 1 and a tail node number being 1. In this case, a node 2412 is the head node and a node 2414 is the tall node. The one-to-many wire has a head node number being 1 and a tail node number being 2 or more. In this case a node 2416 as the head node 2416, and node 241 and 2420 are the tail nodes. The many-to-one wire has a head node number being 2 or more and a tail node number being 1. In this case, the node 2416 is the tail node and the nodes 2418 and 2420 are the head nodes. The many-to-many wire has a head node number being 2 or more and a tail node number being 2 or more. In this case, nodes 2422 and 2424 are the head nods and nodes 2426 and 2428 are tail nodes.

Please refer to FIG. 25. FIG. 25 illustrates a data structure of a wire of one embodiment of the present disclosure.

In this embodiment, an original wire includes two nodes 2512 and 2514 and one wire body 2516.

To set the ends of the wire to become grabbable, this embodiment replaces the nodes of the original wire with the grabbable components to achieve a wirable function.

Please refer to FIG. 12. In step S81, the teaching-end 31 sets a wire bundle relationship for the wire to transform the body nodes of the wire into a wire bundle.

Figure 26:
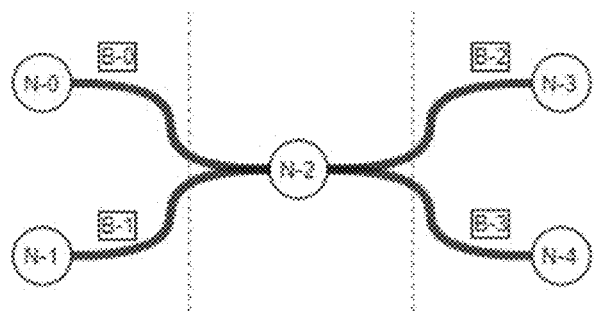
FIG. 26 illustrates a schematic view of a many-to-many wire of one embodiment of the present disclosure.

Please refer to FIG. 26. FIG. 26 illustrates a schematic view of a many-to-many wire of one embodiment of the present disclosure.

Since a wire doesn't have a circular state, the present disclosure may allow the user to directly perform an operation such as setting "(head node number, body node number, tail node number)=(2, 1, 2)" to quickly generate the corresponding wire.

Figure 27:
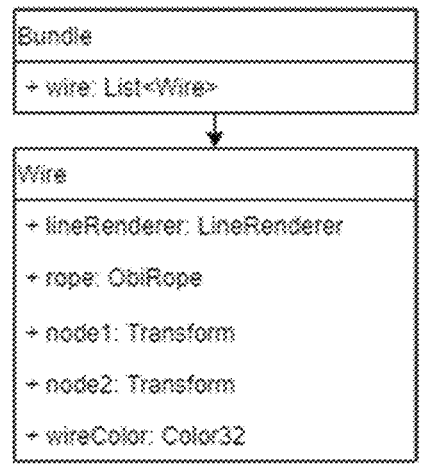
FIG. 27 illustrates a data structure of a wire bundle of one embodiment of the present disclosure.

Please refer to FIG. 27. FIG. 27 illustrates a data structure of a wire bundle of one embodiment of the present disclosure.

In an actual wiring scenario, a wire bundle may be needed. To consider the above scenario, the present disclosure provides a wire bundle class so that the wires may be created under a wire bundle hierarchy.

Figure 28:
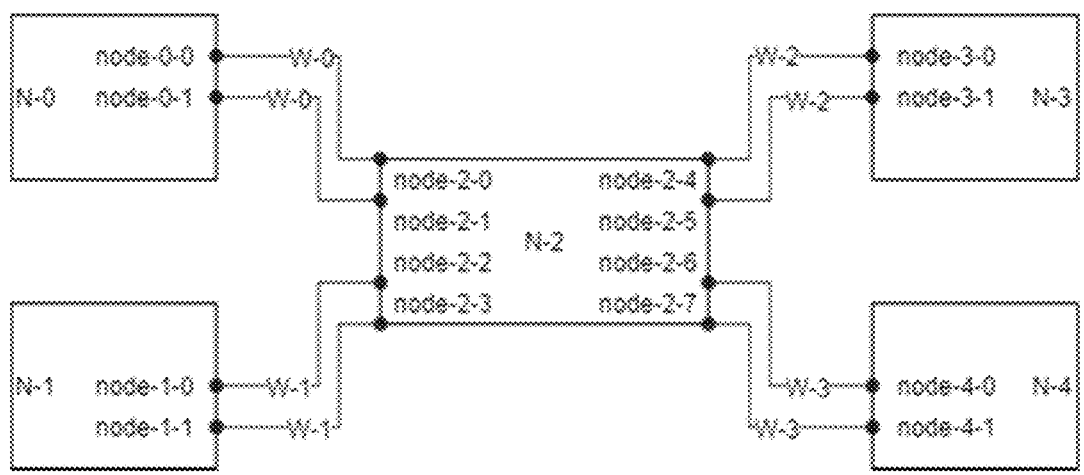
FIG. 28 illustrates an architecture diagram of a generated many-to-many wire of one embodiment of the present disclosure.

Please refer to FIGS. 26 to 28. FIG. 28 illustrates an architecture diagram of a generated many-to-many wire of one embodiment of the present disclosure.

When a user sets "(head node number, body node number, tail node number)=(2, 1, 2)", the teaching-end 31 may set two wires in a wire bundle.

Please refer to FIG. 12, in step S82, the teaching-end 31 sets each node coordinates of each wire.

Figure 29:
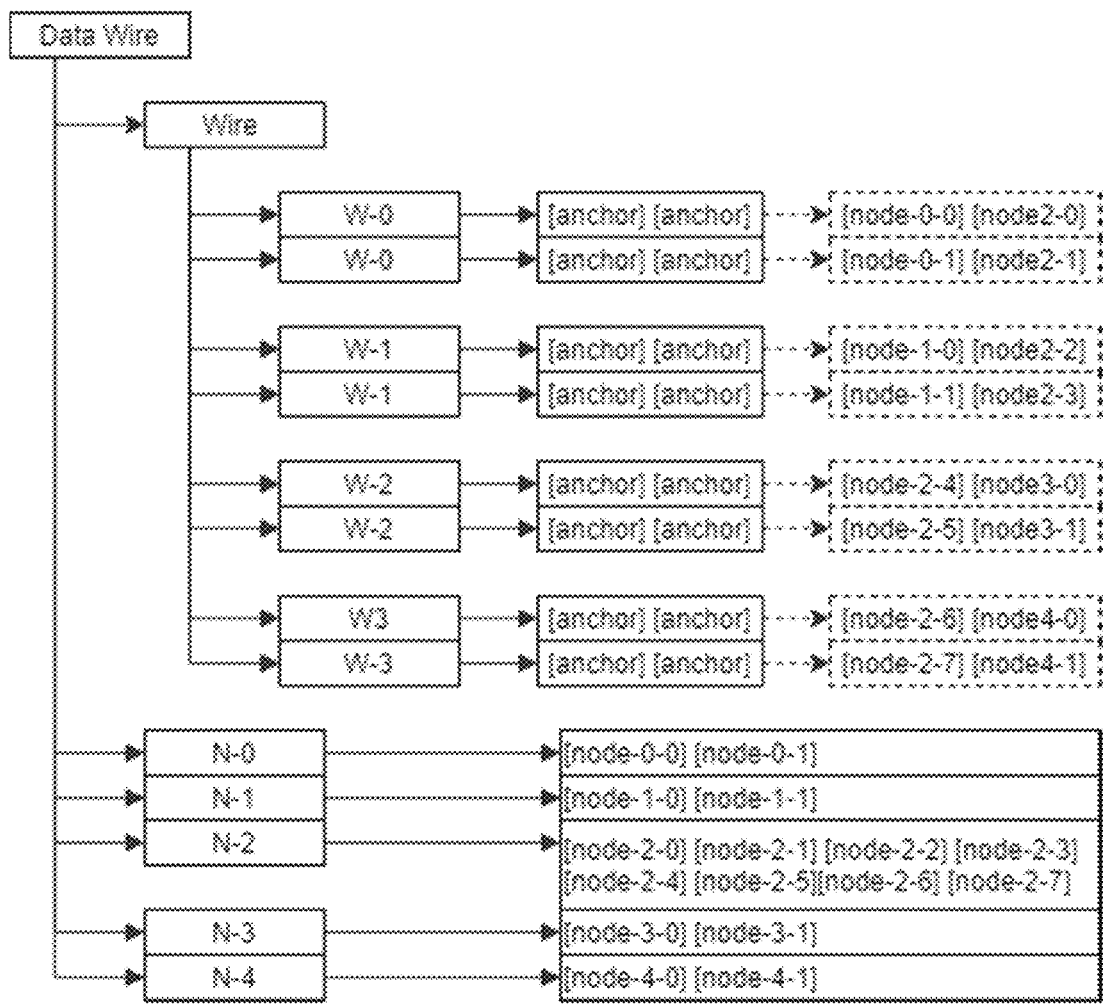
FIG. 29 illustrates a data structure of a generated many-to-many wire of one embodiment of the present disclosure.
Figure 30:
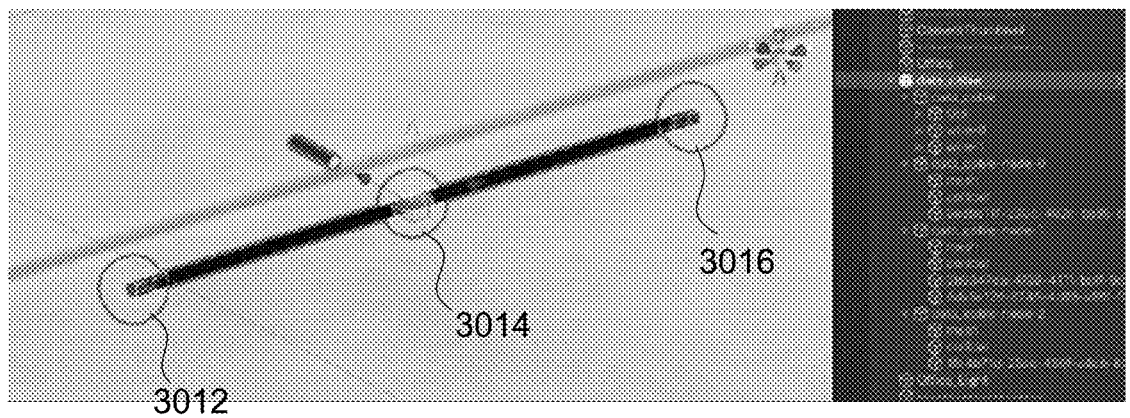
FIG. 30 illustrates a schematic view of a generated many-to-many wire of one embodiment of the present disclosure.

Please refer to FIGS. 28 to 30. FIG. 29 illustrates a data structure of a generated many-to-many wire of one embodiment of the present disclosure. FIG. 30 illustrates a schematic view of a generated many-to-many wire of one embodiment of the present disclosure.

As shown in FIG. 30, each node of a wire initially created is like a normal virtual object and is virtually grabbable. For example, nodes 3012, 3014, and 3016 are virtual objects.

FIG. 29 shows a data structure of the wire shown in FIG. 28. As shown in FIG. 29, each wire initially created follows a node coordinate to achieve a wiring effect.

Figure 31:
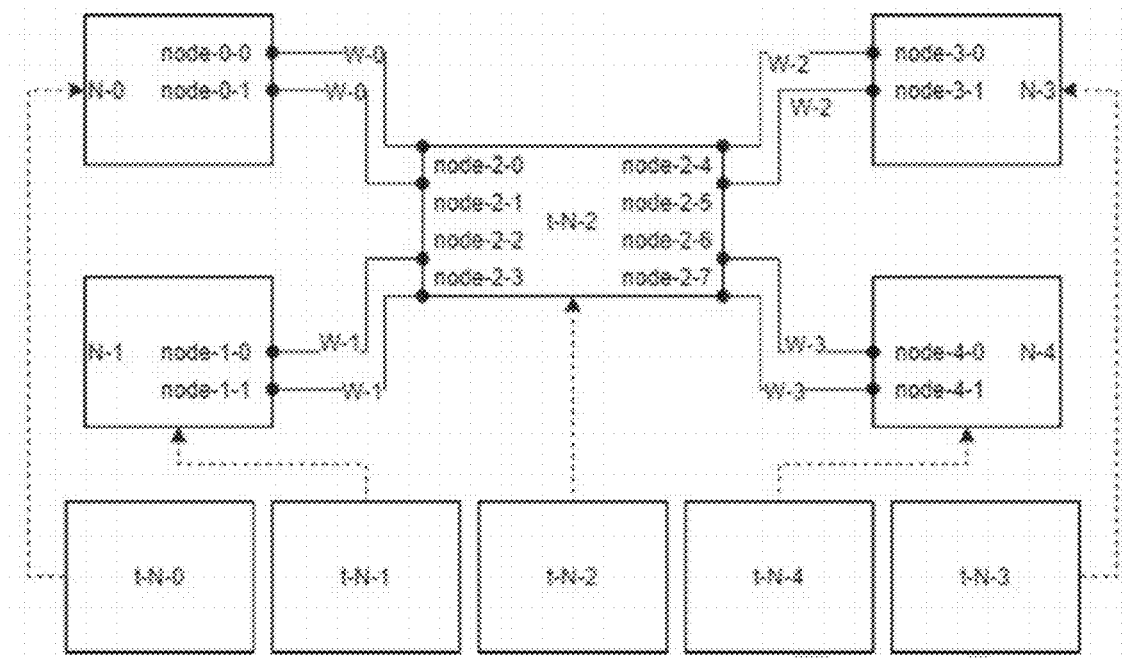
FIG. 31 illustrates an architecture diagram of a recorded many-to-many wire of one embodiment of the present disclosure.
Figure 32:
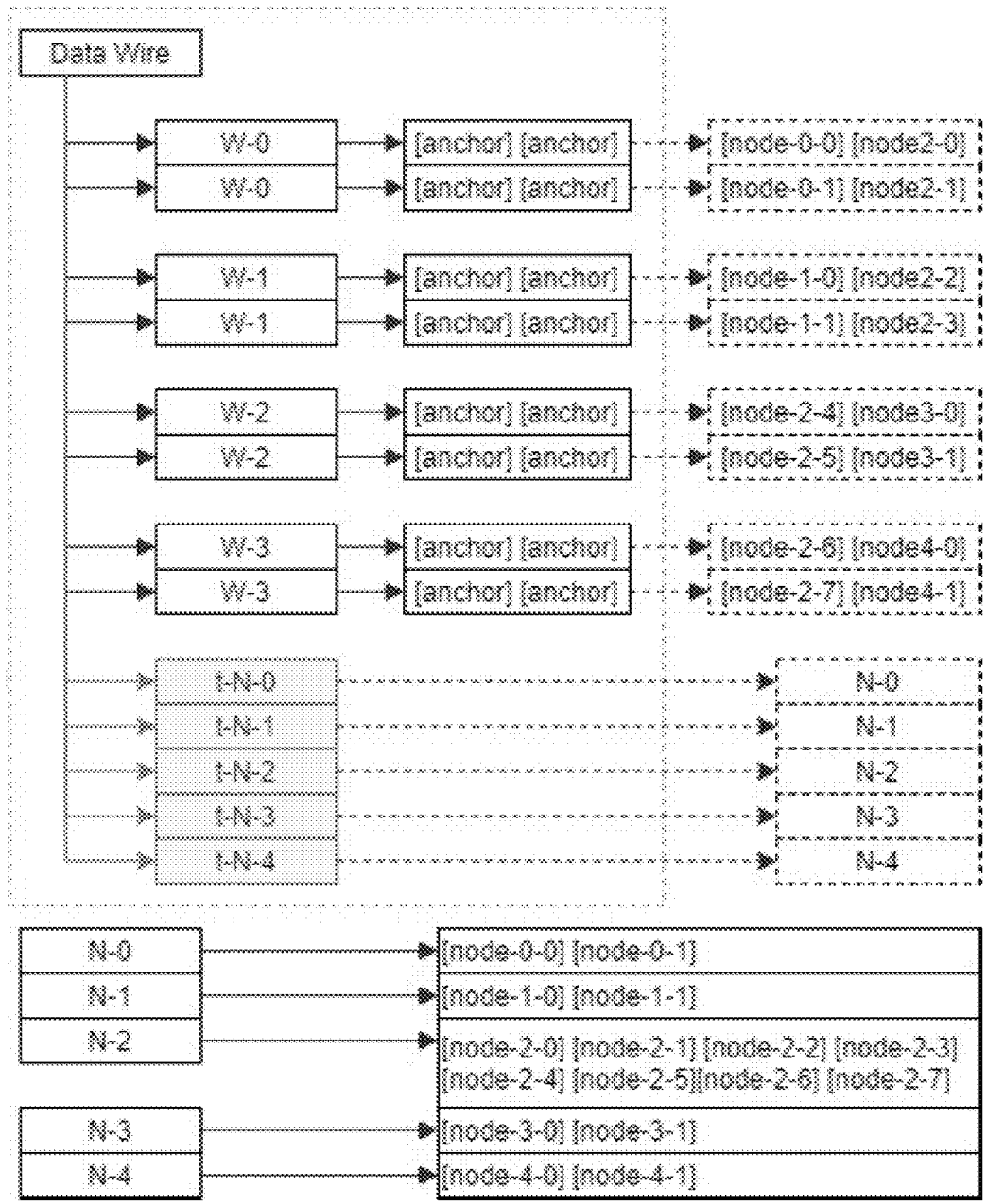
FIG. 32 illustrates a data structure of a recorded many-to-many wire of one embodiment of the present disclosure.
Figure 33:
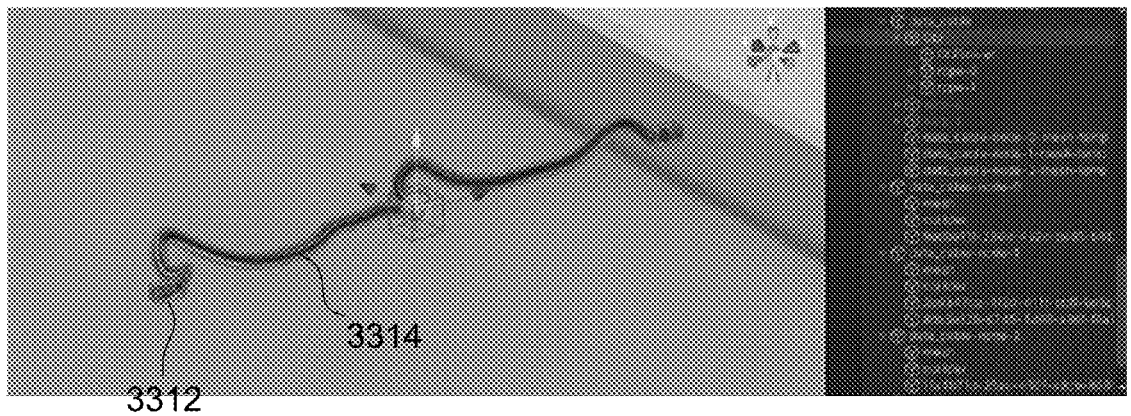
FIG. 33 illustrates a schematic view of a recorded many-to-many wire of one embodiment of the present disclosure.

Please refer to FIGS. 31 to 33. FIG. 31 illustrates an architecture diagram of a recorded many-to-many wire of one embodiment of the present disclosure. FIG. 32 illustrates a data structure of a recorded many-to-many wire of one embodiment of the present disclosure. FIG. 33 illustrates a schematic view of a recorded many-to-many wire of one embodiment of the present disclosure.

As shown in FIGS., in recording, the grabbable node (object 3312) of the wire (object 3314) created by a wire module may be dismantled, and a null object may be created to replace the dismantled node (object 1612 in FIG. 34) for recording the node coordinates. Therefore, no error will occur in the playback of the record.

Figure 34:
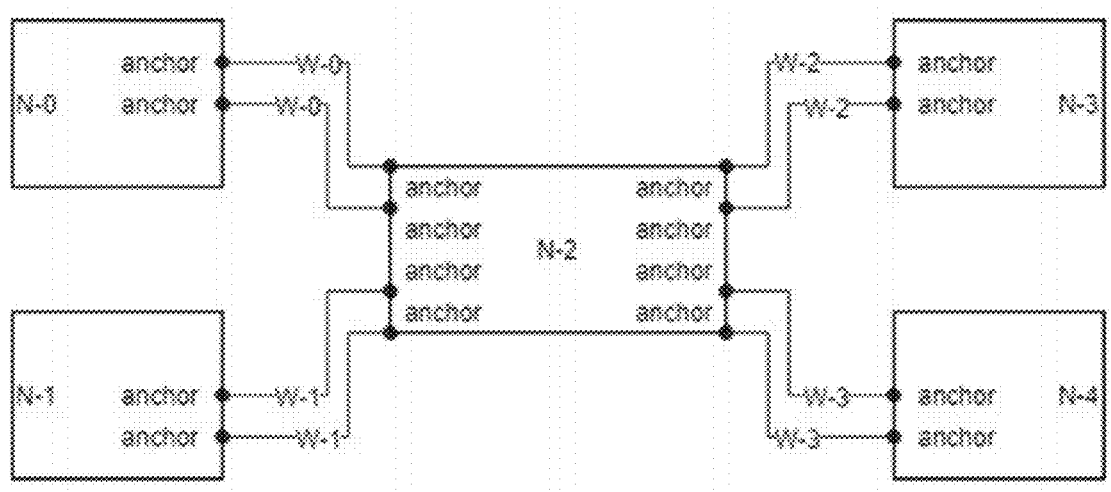
FIG. 34 illustrates an architecture diagram of a playback many-to-many wire of one embodiment of the present disclosure.
Figure 35:
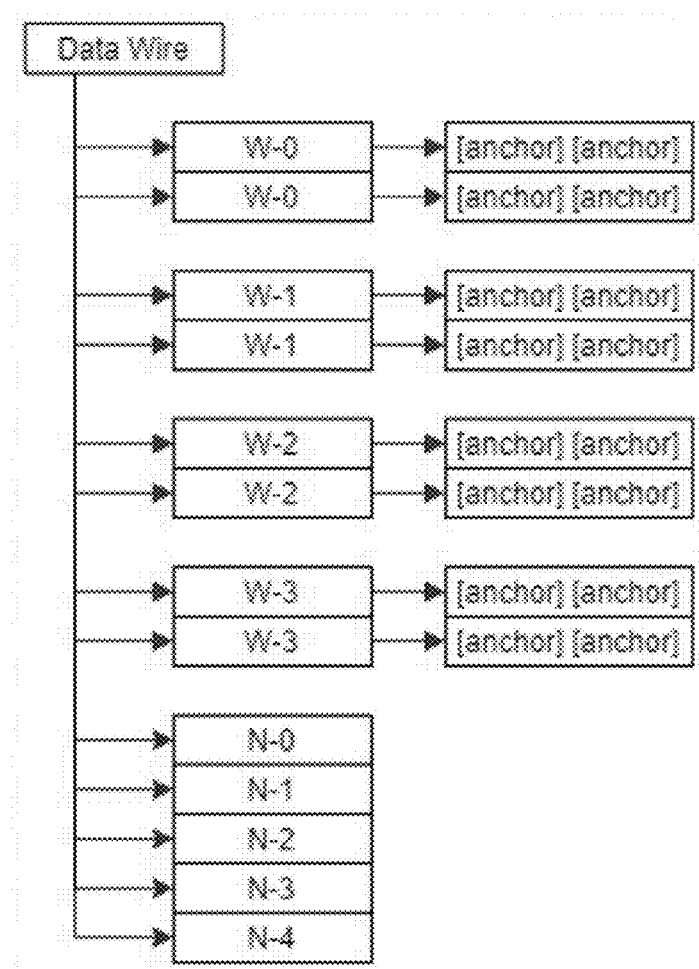
FIG. 35 illustrates a data structure of a playback many-to-many wire of one embodiment of the present disclosure.
Figure 36:
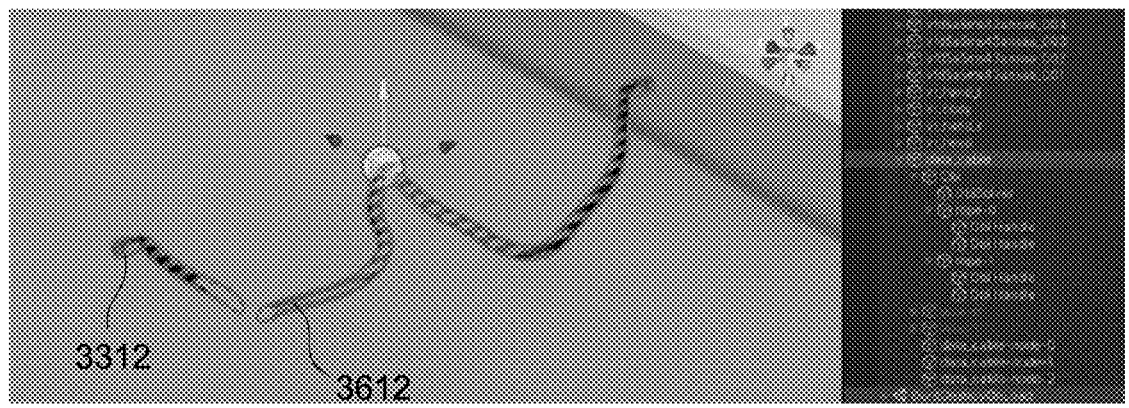
FIG. 36 illustrates a schematic view of a playback many-to-many wire of one embodiment of the present disclosure.

Please refer to FIGS. 34 to 36. FIG. 34 illustrates an architecture diagram of a playback many-to-many wire of one embodiment of the present disclosure. FIG. 35 illustrates a data structure of a playback many-to-many wire of one embodiment of the present disclosure. FIG. 36 illustrates a schematic view of a playback many-to-many wire of one embodiment of the present disclosure.

As shown in FIG. 36, the structure of the wire in the playback is consistent with the structure illustrated in FIG. 33.

Moreover, comparing FIGS. 34 and 35 with FIGS. 31 and 32, it shows that a connection relationship and the positions of the wire are not changed. Namely, no error will occur in the playback of the record.

The present disclosure may ensure that the function of recording and the playback of the wire work correctly by defining a strict object structure of the wire in recording and playback.

While this disclosure has been described by means of specific embodiments, numerous modifications and variations could be made thereto by those skilled in the art without departing from the scope and spirit of this disclosure set forth in the claims.

What is claimed is:

1. A virtual reality system with an inspecting function of assembling and disassembling, the virtual reality system comprising:
    a server-end, used to provide a teaching assembling-disassembling record and an inspection data, wherein the inspection data comprises a plurality of teaching assembling-disassembling statuses of a plurality of virtual objects at each checkpoint; and
    a learning-end, comprising a learning module and a learning virtual reality device, the learning virtual reality device being used to play the teaching assembling-disassembling record and receive user's operations, the learning virtual reality device being used to assemble and disassemble the virtual objects based on the user's operations to modify a learning assembling-disassembling status of the virtual objects, and issue an assembling-disassembling error reminder when the learning assembling-disassembling status is inconsistent with the teaching assembling-disassembling status at any checkpoint;
    wherein the learning module is configured to receive a moving operation through the learning virtual reality device and move at least one of the virtual objects based on the moving operation;
    wherein the learning module is configured to execute a grouping process to assemble the virtual objects being collided into it first group object when an assembling condition is matched; and
    wherein the learning module is configured to execute an ungrouping process to split a second group object being disassembled into the virtual objects when a disassembling condition is matched.

2. The virtual reality system according to claim 1, wherein the learning module comprises:
    a record playback module, used to play the teaching assembling-disassembling record through the learning virtual reality device, set physical attributes of the virtual objects, initialize renderer components, and initialize collider components;
    a learning interactive module, used to determine a position of a virtual hand, and move the virtual hand based on the user's operations made to the learning virtual reality device; and
    an inspection execution module, used to detect whether the learning assembling-disassembling status is consistent with the teaching assembling-disassembling status at each checkpoint.

3. The virtual reality system according to claim 1, wherein the learning module is configured to create a boundary list used to record a boundary of each of the virtual objects;
    wherein the learning module is configured to detect a collision of a wire or a stroke through a line renderer when any of the virtual objects is the wire or the stroke;
    wherein the learning module is configured to compute the boundary of a normal object through a mesh renderer when any of the virtual objects is the normal object and detect a collision of the normal object based on the boundary;
    wherein the learning module is configured to execute a grabbing detection and an assembling detection based on a detection result of the collision.

4. The virtual reality system according to claim 3, wherein the learning module is configured to acquire an object posture of the normal object, compute a bounding box aligned with axes of the virtual object, rotate the bounding box base on the object posture to obtain a rotated bounding box, and set the rotated bounding box as an object bounding box of the normal object;
    wherein the object bounding box is a collision boundary of the normal object used to detect the collision of the normal object.

5. The virtual reality system according to claim 1, wherein the learning module is configured to generate the first group object being grabbable, set the virtual objects being collided as sub-objects of the first group object, and set the sub-objects of the first group object to be not grabbable.

6. The virtual reality system according to claim 1, wherein the learning is configured to remove links between sub-objects of the second group object, remove the second group object, and set the sub-objects as the virtual objects being grabbable.

7. The virtual reality system according to claim 1, wherein the learning module is configured to issue an action error reminder when detecting an action to the virtual object is incorrect, issue a structure error reminder when detecting a structure of the virtual object is incorrect, issue a position error reminder when detecting a position of the virtual object is incorrect, or issuing a sequence error reminder when an assembling sequence of the virtual object is incorrect.

8. The virtual reality system according to claim 1, further comprising a teaching-end;
  wherein the teaching-end comprises a teaching module and a teaching virtual reality device;
  wherein the teaching virtual reality device is used to display the virtual objects and receive user's operations;
  wherein the teaching module is used to execute an initialing process, create the virtual objects based on an object-creating operation, create a wire used to link the virtual objects based on a wire-creating operation, modify the teaching assembling-disassembling status of the virtual objects based on a teaching assembling-disassembling operation, and generate the teaching assembling-disassembling record.

9. The virtual reality system according to claim 8, wherein the wire-creating operation comprises a step of setting a head node number, a body node number, and a tail node number;
  wherein the teaching module is used to create the wire based on the head node number, the body node number, and the tail node number, set a wire bundle relationship of the wire to transform body nodes into a wire bundle, and set node coordinates of the wire;
  wherein at least one head node and at least one tail node of the wire are connected to the virtual objects.

10. An inspecting method of assembling and disassembling based on virtual reality, comprising steps of:
  a) at a learning-end, acquiring an inspection data and a teaching assembling-disassembling status having multiple checkpoints, wherein the inspection data comprises teaching assembling-disassembling statuses of multiple virtual objects at each checkpoint;
  b) at the learning-end, playing the teaching assembling-disassembling record;
  c) at the learning-end, receiving user's operations to assemble and disassemble the virtual objects to modify a learning assembling-disassembling status of the virtual objects; and
  d) issuing an assembling-disassembling error reminder when the learning assembling-disassembling status is inconsistent with the teaching assembling-disassembling status at any checkpoint;
  wherein the step c) comprises steps of:
  c21) moving at least one of the virtual objects based on a moving operation;
  c22) executing a grouping process to assemble the virtual objects being collided into a first group object when an assembling condition is matched; and
  c23) executing and ungrouping process to split a second group object being disassembled into the virtual objects when a disassembling condition is matched.

11. The inspecting method according to claim 10, before the step c), further comprising steps of:
  e1) determine a position of a virtual hand;
  e2) setting physical attributes of virtual objects;
  e3) initializing renderer components; and
  e4) initializing collider components.

12. The inspecting method according to claim 10, wherein the step c) comprises steps of:
  c11) creating a boundary list used to record a boundary of each of the virtual objects;
  c12) detecting a collision of a wire or a stroke through a line renderer when any of the virtual objects is the wire or the stroke;
  c13) computing the boundary of a normal object through a mesh renderer when any of the virtual objects is the normal object, and detecting a collision of the normal object based on the boundary; and
  c14) executing a grabbing detection and an assembling detection based on a detection result of the collision.

13. The inspecting method according to claim 12, wherein the step of computing the boundary of the normal object comprises steps of:
  c131) acquiring an object posture of the normal object;
  c132) computing a bounding box aligned with axes of the virtual object;
  c133) rotating the bounding box based on the object posture to obtain a rotated bounding box; and
  c134) setting the rotated bounding box as an object bounding box of the normal object, wherein the object bounding box is a collision boundary of the normal object and is used to detect the collision of the normal object.

14. The inspecting method according to claim 10, wherein the grouping process comprises steps of:
  c221) generating the first group object being grabbable, and setting the virtual objects being collided as sub-objects of the first group object;
  c222) setting the sub-objects of the first group object to be not grabbable.

15. The inspecting method according to claim 10, wherein the ungrouping process comprises steps of:
  c231) removing links between the sub-objects of the second group object, and removing the second group object; and
  c232) setting the sub-objects as the virtual objects being grabbable.

16. The inspecting method according to claim 10, wherein the step d) comprises at least one of the following steps of:
  d1) issuing an action error reminder when detecting an action to the virtual object is incorrect;
  d2) issuing a structure error reminder when detecting a structure of the virtual object is incorrect;
  d3) issuing a position error reminder when detecting a position of the virtual object is incorrect; and
  d4) issuing a sequence error reminder when an assembling sequence of the virtual object is incorrect.

17. The inspecting method according to claim 10, before the step a), further comprising steps of:
  f1) at a teaching-end, executing an initialing process;
  f2) creating the virtual objects based on an object-creating operation;
  f3) creating a wire used to link the virtual objects based on a wire-creating operation;
  f4) modifying the teaching assembling-disassembling status of the virtual objects based on a teaching assembling-disassembling operation;

f5) setting the checkpoints and recording each teaching assembling-disassembling status at each checkpoint; and f6) generating the teaching assembling-disassembling record.

18. The inspecting method according to claim 17, wherein the wire-creating operation comprises a step of setting a head node number, a body node number, and a tail node number;

wherein the step f3) comprises steps of:

f31) creating the wire based on the head node number, the body node number, and the tail node number, wherein at least one head node and at least one tail node of the wire are connected to the virtual objects;

f32) setting a wire bundle relationship of the wire to transform body nodes into a wire bundle; and f33) setting node coordinates of the wire.

* * * * *